US009647942B2

(12) United States Patent
Jin et al.

(10) Patent No.: US 9,647,942 B2
(45) Date of Patent: May 9, 2017

(54) CONTENT CENTRIC AND LOAD-BALANCING AWARE DYNAMIC DATA AGGREGATION

(71) Applicant: KABUSHIKI KAISHA TOSHIBA, Minato-ku (JP)

(72) Inventors: Yichao Jin, Bristol (GB); Sedat Gormus, Bristol (GB)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 89 days.

(21) Appl. No.: 14/404,524

(22) PCT Filed: Mar. 28, 2013

(86) PCT No.: PCT/GB2013/050850
§ 371 (c)(1),
(2) Date: Nov. 28, 2014

(87) PCT Pub. No.: WO2013/178981
PCT Pub. Date: Dec. 5, 2013

(65) Prior Publication Data
US 2015/0109926 A1    Apr. 23, 2015

(30) Foreign Application Priority Data

May 31, 2012 (GB) .................................. 1209740.8

(51) Int. Cl.
*H04L 12/803* (2013.01)
*H04W 24/02* (2009.01)
*H04W 40/04* (2009.01)
(Continued)

(52) U.S. Cl.
CPC ........... *H04L 47/125* (2013.01); *H04W 40/04* (2013.01); *H04W 40/22* (2013.01); *H04L 45/121* (2013.01);
(Continued)

(58) Field of Classification Search
CPC ..... H04W 84/18; H04W 28/06; H04W 24/08; H04W 40/005; H04W 40/02;
(Continued)

(56) References Cited

U.S. PATENT DOCUMENTS 7,391,742 B2 *   6/2008   Zabele .................... H04L 45/00
                                                          370/254
7,873,673 B2 *   1/2011   Cleveland .............. G01D 21/00
                                                          707/802
(Continued)

FOREIGN PATENT DOCUMENTS

EP         1 835 668 A1      9/2007

OTHER PUBLICATIONS

Iyer et al, Performance Analysis of Wireless Mesh Routing Protocols for Smart Utility Networks, IEEE , 2011, pp. 114-119.*

(Continued)

*Primary Examiner* — Ahmed Elallam
(74) *Attorney, Agent, or Firm* — Oblon, McClelland, Maier & Neustadt, L.L.P.

(57) ABSTRACT

A method of determining a communication link for sending communication data from a first communications node to any one of a plurality of neighboring candidate nodes, comprising i) for each candidate node, determining a marginal processing gain comprising a measure of the communication data reduction available through aggregating the communication data at the candidate node; and ii) selecting one of the candidate nodes for forming the communication link, wherein the selection is based at least in part on the marginal processing gain determined for each candidate node.

24 Claims, 25 Drawing Sheets

(51) Int. Cl.
*H04W 40/22* (2009.01)
*H04L 12/729* (2013.01)
*H04W 40/10* (2009.01)
*H04L 12/727* (2013.01)
*H04L 12/721* (2013.01)
*H04W 84/18* (2009.01)

(52) U.S. Cl.
CPC .......... *H04L 45/125* (2013.01); *H04L 45/127* (2013.01); *H04W 40/10* (2013.01); *H04W 84/18* (2013.01)

(58) Field of Classification Search
CPC ..... H04W 40/04; H04W 40/08; H04W 40/22; H04W 40/10; H04W 40/38; H04W 28/08; H04L 45/123; H04L 67/12; H04L 45/02; H04L 45/122; H04L 45/26; H04L 45/12; H04L 45/121; H04L 45/124; H04L 45/125; H04L 45/127; H04L 45/70; H04L 47/125; H04L 69/04
See application file for complete search history.

(56) References Cited

U.S. PATENT DOCUMENTS

| | | | |
|---|---|---|---|
| 7,996,189 B2 * | 8/2011 | Kaplan | H04M 1/72569 702/182 |
| 8,023,501 B1 | 9/2011 | Wang | |
| 8,238,290 B2 * | 8/2012 | Ordentlich | H04L 69/04 370/328 |
| 8,855,011 B2 * | 10/2014 | Ortega | H04W 52/04 370/254 |
| 2009/0016224 A1 * | 1/2009 | De | H04L 45/02 370/238 |
| 2009/0303034 A1 * | 12/2009 | Abedi | G06Q 10/04 340/539.1 |
| 2010/0008256 A1 * | 1/2010 | Chebbo | H04W 84/18 370/254 |
| 2011/0164527 A1 * | 7/2011 | Mishra | H04L 45/123 370/252 |
| 2013/0121331 A1 * | 5/2013 | Vasseur | H04W 40/14 370/351 |

OTHER PUBLICATIONS

Miroslav Fiedler, et al., "A factorization of totally nonsingular matrices over a ring with identity", Elsevier Linear Algebra and its Applications 304, 2000, XP55098430A, pp. 161-171.
International Search Report issued Jun. 14, 2013, in PCT/GB13/050850 filed Mar. 28, 2013.
Written Opinion of the International Searching Authority issued Jun. 14, 2013, in PCT/GB13/050850 filed Mar. 28, 2013.

* cited by examiner a. candidate node: 2,3,5,6
b. candidate node: 3,5,6
c. candidate node: 5,6

S   Source         - - - - -   Unreliable link      ○ relay only
G   Gateway / sink ———         Reliable link        ⃝ process and relay (a)

(b)

(c)

(d)

(a)

(b)

Advantage of TTGF loop avoidance

| Algorithm | LACDA (TTGF=2) | LACDA (TTGF=0) |
|---|---|---|
| Network lifetime (rounds) | 161 | 77 |

Fig. 25

CONTENT CENTRIC AND LOAD-BALANCING AWARE DYNAMIC DATA AGGREGATION

FIELD

Embodiments disclosed herein relate to the communication of data in a communications network.

BACKGROUND

In emerging Machine-to-Machine (M2M) applications e.g. intelligent systems like the smart grid and the smart city, it is anticipated that a large number of small and smart devices such as wireless sensor nodes will be deployed. These nodes are expected to facilitate continuous sensing and gathering of data for observing/monitoring the object of interest. Then, the collected information needs to be somehow passed to a control centre in order to enable adaptation decision and realize system automation. It follows that there is an increased demand for transport of data on multi-hop routes, i.e. on routes between a source node and a destination node, involving one or more intermediary nodes.

Transporting raw data over multi-hop wireless links can be costly both in terms of time as well as resources. The total amount of traffic to be forwarded on multi-hop routes can be significantly reduced using in-network processing and data aggregation, particularly by pre-processing of correlated information. For example, energy-efficient data aggregation and fusion schemes can pre-process the data within the network and only send the processed result with much less data volume compared to its original size. Thus, these schemes can reduce redundant traffic and avoid data overloading for future wireless networks. However, a suitable data forwarding scheme is needed as a prior condition in order to efficiently compute and relay data.

BRIEF DESCRIPTION OF THE DRAWINGS

FIG. 25 shows an example of how the network lifetime may be increased by using a loop avoidance scheme according to an embodiment described herein.

DETAILED DESCRIPTION

Figure 1A:
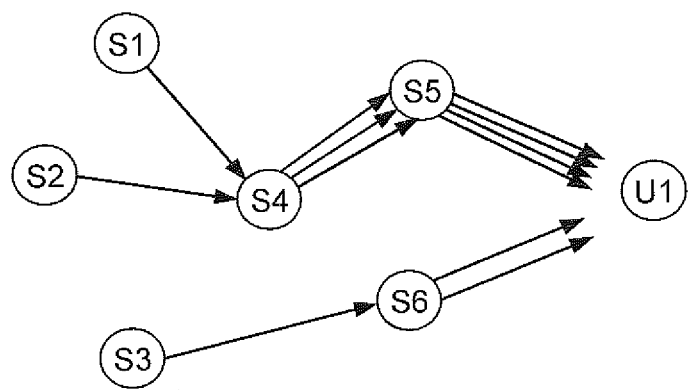
FIG. 1(a) illustrates a routing approach in the field of a described embodiment.

According to a first embodiment, there is provided a method of determining a communication link for sending communication data from a first communications node to any one of a plurality of neighbouring candidate nodes, comprising:

i) for each candidate node, determining a marginal processing gain comprising a measure of the communication data reduction available through aggregating the communication data at the candidate node; and ii) selecting one of the candidate nodes for forming the communication link, wherein the selection is based at least in part on the marginal processing gain determined for each candidate node.

In some embodiments, the measure of communication data reduction is normalised.

In some embodiments, the marginal processing gain for a candidate node comprises a difference between a measure of processing gain when allocating said communication data to that candidate node and a measure of processing gain without allocating said communication data to said candidate node.

In some embodiments, the marginal processing gain is part of an objective function that also comprises a measure of local lifetime gain, the local lifetime gain defining the change in lifetime of one or other of the neighbouring candidate nodes achieved by allocating the communication data to the candidate node. The method may comprise evaluating the objective function for each candidate node in order to determine the node to be selected for the communication link.

In some embodiments, evaluating the objective function for a given candidate node comprises:
estimating the lifetime of each one of the neighbouring candidate nodes in the event that the communication data is allocated to the given candidate node;
estimating the lifetime of each one of the neighbouring candidate nodes in the event that the communication data is not allocated to the given candidate node;
wherein in each case, the local lifetime is defined as the lifetime of the node having the smallest estimated lifetime among the neighbouring candidate nodes; and
wherein the local lifetime gain for the given candidate node is determined based on the difference between the local lifetime in the event that the communication data is allocated to that candidate node and the local lifetime in the event that the communication data is not allocated to that candidate node.

In some embodiments, the measure of local lifetime gain is normalised by the local lifetime estimated for the case in which communication data is allocated to that candidate node.

In some embodiments, the objective function comprises a weighted sum of the measure of processing gain and the measure of local lifetime gain. The weighted sum may be dependent on a weighting factor, the weighting factor being operable to balance, in the objective function, the effect of the measure of processing gain and the measure of local lifetime gain, with respect to sensitivity to network lifetime.

In some embodiments, the lifetime of the neighbouring candidate nodes is estimated by estimating the energy consumption of those neighbouring candidate nodes.

In some embodiments, the energy consumption of each neighbouring candidate node is estimated by defining a link quality parameter between the first communications node and the respective neighbouring candidate node, wherein the link quality parameter reflects the likelihood that data will need to be transmitted more than once between the first communications node and the neighbouring candidate node in order to ensure its successful delivery. The link quality parameter may define the average number of times a bit of data will need to be transmitted in order to be successfully delivered from the first communications node to the respective neighbouring candidate node.

In some embodiments, for each candidate node, the lifetime of the first communications node is taken into consideration when determining the local lifetime gain in allocating the communication data to the candidate node.

In some embodiments, the communication data comprises a plurality of data types and the method comprises carrying out steps i) and ii) for each type of data. Each type of data may comprise data capable of being aggregated by a respective function or application running on a node, so as to reduce the number of bits required to relay that data. Each type of data may comprise a sensor reading reflecting a different parameter of the environment.

In some embodiments, for each type of data, the marginal processing gain is part of an objective function that also comprises a measure of local lifetime gain, the local lifetime gain defining the change in lifetime of one or other of the neighbouring candidate nodes if allocating the communication data of the particular type to the candidate node. The method may comprise evaluating the objective function for each candidate node in order to determine the node to be selected for the communication link for the particular type of communication data.

In some embodiments, for each type of data, the objective function comprises a reward parameter that biases selection of the candidate node towards nodes that have the capability to aggregate data of that particular type.

In some embodiments, the objective function is executed at a number of intervals. The size of the intervals may be determined based on the amount of variation in the type of data arriving at the first communications node. The method may comprise:
monitoring the number of different types of data arriving at the first communications node at each one a number of intervals;
for each interval, determining a change in the number of types of data that have arrived compared to the previous interval;
based on said change, determining a probability that the objective function should be executed; and
where the probability is found to be above a threshold, executing the objective function.

In some embodiments, the threshold is obtained from a random number generator.

In some embodiments, the communication data is included within a data packet that also includes a communication progress factor. The communication progress factor may be used to govern selection of the candidate node for forward communication in the network towards an intended recipient node.

In some embodiments, the communication progress factor comprises an indication of the layer of the network in which the first communications node is located. When selecting a candidate node for the communication link, the first communications node may exclude from consideration as candidate nodes all neighbouring nodes that are located in layers further away from the recipient node, unless those neighbouring nodes have the capability of performing data aggregation on the type of data being transmitted by the first communications node.

In some embodiments the communication progress factor comprises:
an indication of the layer of the network in which the first communications node is located, and
a counter, wherein the counter's value is incremented each time the communication data is transmitted to a node in a layer that is as either the same as that of the first communications node or further away from the recipient node. When the value of the counter reaches a threshold, the first communications node may only consider nodes that are located closer to the recipient node as candidate nodes for forwarding the communication data.

According to another embodiment, there is provided a communications apparatus operable in a network of communications apparatus, the apparatus being operable to determine a communication link for a communication from said apparatus to any one of a plurality of candidate neighbouring apparatuses, the apparatus comprising a processing gain determiner operable to determine, for each candidate node, a marginal processing gain comprising a measure of communication data reduction available through aggregating communication data at the candidate node; and a communication link selector operable to select one of the candidate nodes for forming the communication link, the selection being based at least in part on the marginal processing gain determined for each candidate node.

According to another embodiment, there is provided a computer program product comprising computer executable instructions which, when executed by a computerised communications apparatus, causes that apparatus to perform a method in accordance with the first embodiment.

FIG. 1a illustrates a problem which may be encountered in the field, if no in-network processing takes place. In this case, communications are sent on multi-hop pathways from source nodes (indicated S1-S6) without reference to each other, to a sink node indicated U1. As illustrated, the communications aggregate on nodes S4, S5 and S6 and later hops in the communication require substantial channel capacity otherwise communication delay, failure or other deleterious consequences arise.

As a general principle, the embodiments described herein operate by taking advantage of distributed processing. A content centric and load balancing aware distributed data routing solution is presented for large-scale multi-hop M2M wireless networks. Independent routing decisions are made by each node using only local information. Hence, the approach is highly adaptive to dynamic environments.

In one embodiment, a hybrid objective function for route selection is described which includes two main parts:
1. Reduce the communication traffic by aggregating similar types of data, hence increasing the processing gain;
2. Balance the energy-consumption among neighbouring nodes such that a longer local network lifetime can be achieved.

Eventually, in certain embodiments, the entire network lifetime can also be extended by solving the load-balancing issue on bottleneck nodes.

Conventionally, in typical data gathering scenarios, information collected by nodes is first sent to a central gateway node (sink). This information is then processed for further analysis. However, in many cases, since data collected from different nodes is highly correlated, it can be combined or jointly processed while forwarding to the sink. For example, there may be considerable correlation of data streams comprising data reports of AVERAGE or MAX readings for monitoring applications, or of data streams containing sensor readings for multiple sensors all sensing the same physical event.

In-network processing deals with this type of distributed processing of information within the network in order to reduce the total amount of messages to be sent over expensive wireless links, which has a significant impact on energy consumption as well as overall network efficiency. However, one of the main problems in this area is how data is being processed and relayed by considering various system aspects, such as multiple co-existing applications (data generated for different applications may not be correlated), heterogeneous node energy levels, and load-balancing issues (some bottleneck nodes may affect the performance of the entire network due to high workload or low remaining energy), etc.

Figure 1B:
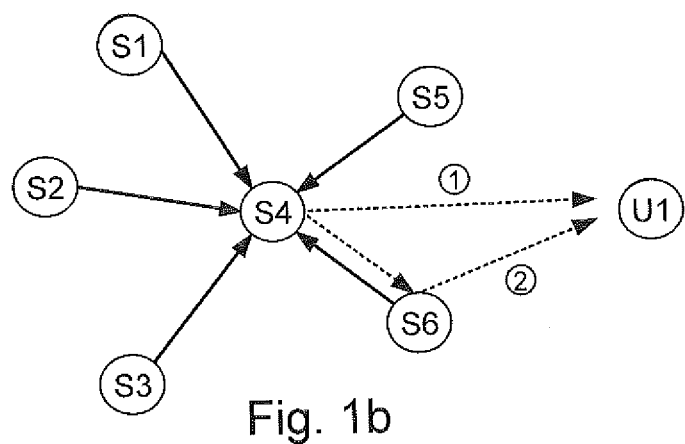
FIG. 1(b) illustrates a further routing approach in the field of a described embodiment.

Efficient data gathering and aggregation in resources constrained networks have been considered in the past. FIG. 1b illustrates clustering. Clustering is a simple but effective hierarchical data gathering solution, where Cluster-Heads (CHs) are polled via message gossiping among nodes in local areas and, once selected, they act as local controllers of network operations. So, as illustrated in FIG. 1b, node S4 has been identified as an appropriate cluster head (CH), and this gathers transmissions from nodes S1, S2, S3, S5 and S6, before transmission of an aggregated communication either through a long distance hop (indicated, ①) or through a multi-hop pathway via node S5 (indicated ②). When clusters are formed, all packets in the same cluster are directly sent to the CH, and then a summary message is produced and transmitted back to the sink.

However, a periodical re-construction of the network structure (re-clustering) is required for load-balancing purposes, which incurs additional delay and extra energy consumption on communication overhead. In addition, these algorithms are vulnerable under dynamic network conditions and a homogeneous traffic pattern is usually assumed (i.e. all nodes in the network are reporting the same type of messages periodically).

Figure 1C:
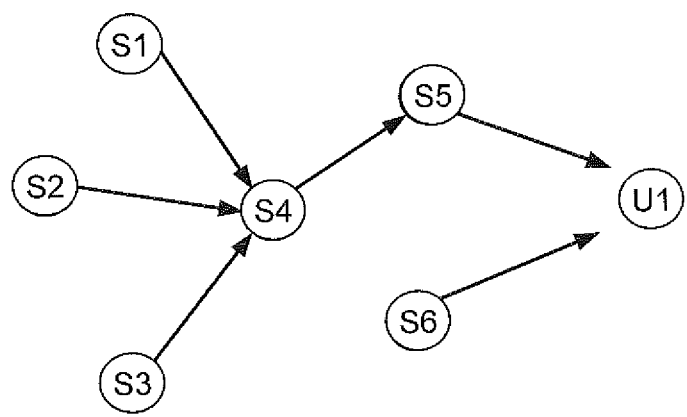
FIG. 1(c) illustrates a yet further routing approach in the field of a described embodiment.

Similar to clustering-based algorithms, tree-based approaches (FIG. 1c) first need to construct an appropriate tree structure based on different requirements, and then the traffic flow from sources to the sink (root of the tree) is routed based on the preferred directions in the tree. Data aggregation takes place once two or more messages arrive at a processing node, and their aggregate can be computed and then forwarded to the next hop.

Nonetheless, the drawback of tree-based schemes is similar to that of clustering based algorithms. Each time the traffic of an application changes or a new application arrives, the optimized tree structure need to be re-formed based on the new requirement.

Hence, in a dynamic environment with multiple applications co-existing, different data aggregation paths are required for efficient delivery of different data types and better organization of heterogeneous traffic flows. A pre-optimized static structure cannot satisfy this dynamic requirement. On the other hand, it is not computationally efficient to frequently reconstruct a global network topology or to compute and build multiple overlaid trees, and thus this approach would be expensive to maintain.

The embodiments described herein differ from conventional aggregation approaches by taking several challenging problems into account such as, for example, content-centric routing and processing, load balancing, communication reliability, and network dynamicity. A distributed decision making approach is employed by running an objective function on each node considering processing efficiency, network lifetime extension, and in some cases communication reliability. Furthermore, embodiments implement a content-centric technique which differentiates network traffic by its content. Therefore, based on the content type of a message, each node may construct a different routing table by executing the objective function. By doing so, the total amount of traffic can be reduced by aggregating correlated data to nodes where they can be processed. As a consequence, this improves the energy-efficiency and extends the network lifetime. Hence, embodiments can generate alternative data aggregation paths for efficient delivery of different traffic types and better organization of heterogeneous traffic flows.

Embodiments described herein provide an efficient routing solution by integration of distributed processing and load balancing technologies for networks with dynamic and heterogeneous traffic patterns.

Figure 2:
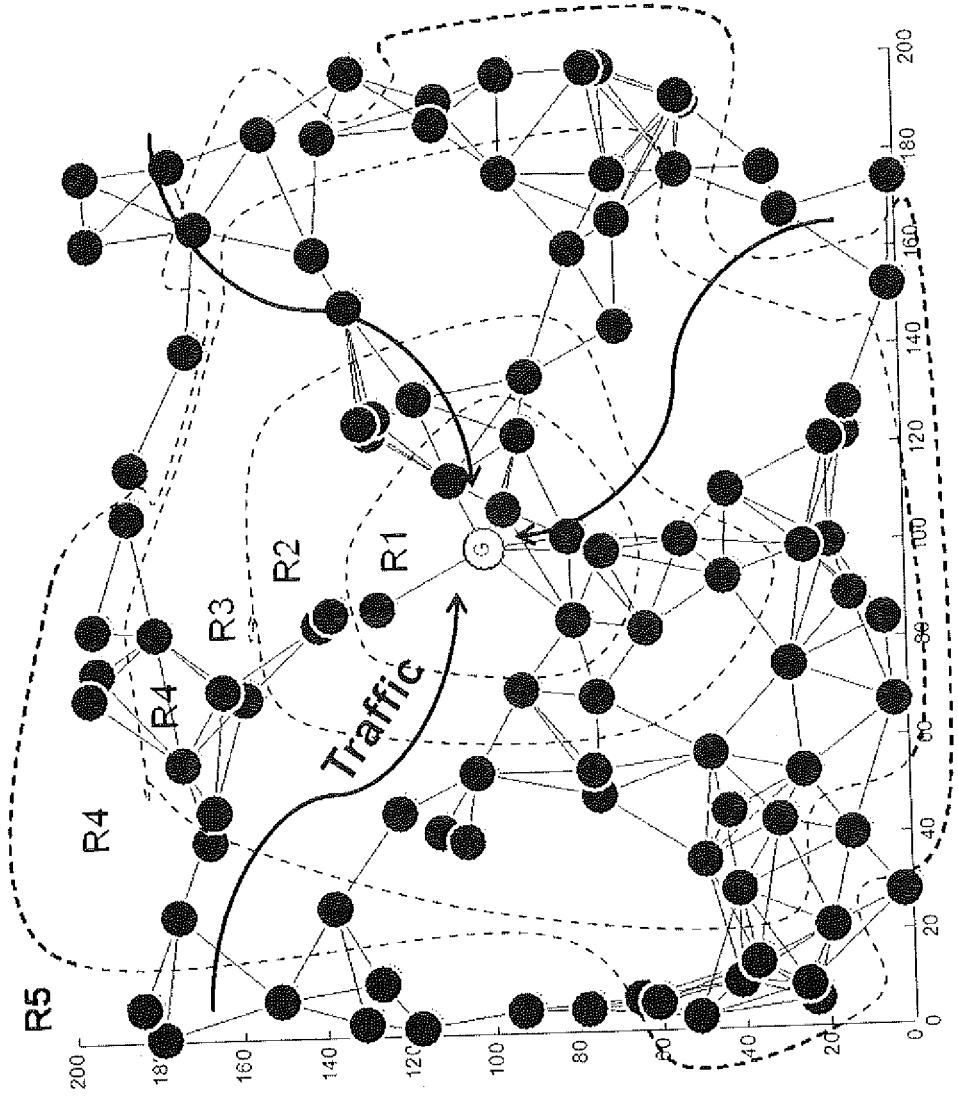
FIG. 2 is a diagram showing a network of communications nodes, illustrating an embodiment described herein.

An embodiment will now be described from the perspective of a network, as illustrated in FIG. 2. The network is formed by N nodes $V=\{v_1, v_2, \ldots, v_N\}$. A gateway $v_0$ sits at the centre of the network. Nodes are battery powered and each node has an finite and non-replenishment energy supply E(i). Heterogeneous initial node energy levels are assumed. As in many practical systems, the gateway $v_0$ is considered as a more powerful node, and is assumed to have a much higher initial energy level than other nodes, or is connected to an unlimited power supply. For simplicity, transmission power control is not enabled. Hence, all nodes have a fixed communication range and they are connected via multi-hop links. Hence, a wave-like communication ring topology can be formed. Nodes in each ring (layer) are assigned with a layer ID representing the minimum number of hops required to reach the sink (FIG. 2).

From the perspective of applications executing in the network, applications $A=\{a_1, a_2, a_3 \ldots\}$ randomly arrive at the gateway with a probability $P_{app}$ and lifetime duration $T=\{t_1, t_2, t_3 \ldots\}$. For each application, a certain number of source nodes are required which generate the initial data. Source nodes can be pre-selected based on the application requirement (e.g. monitoring a particular area) or randomly chosen by the gateway.

Time is divided into periods called rounds, and it is assumed that traffic is generated at a homogeneous rate of r bits per packet per round for all source nodes of the same application, but different traffic rates ($R=\{r_1, r_2, r_3 \ldots\}$) can be produced for different applications.

Once the application lifetime T falls due, corresponding source nodes will stop generating and sending data for that application. The same application can reappear in the network with probability $P_{app}$ once the previous one is terminated, and multiple different applications can co-exist in the network.

Figure 3A:
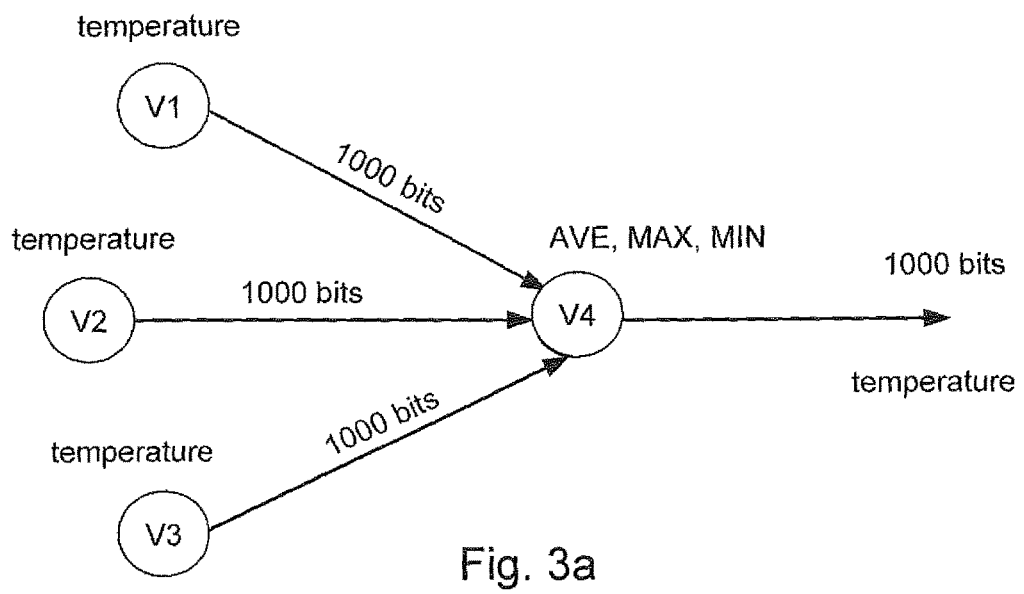
FIG. 3(a) illustrates an example of routing in the network of FIG. 2.
Figure 3B:
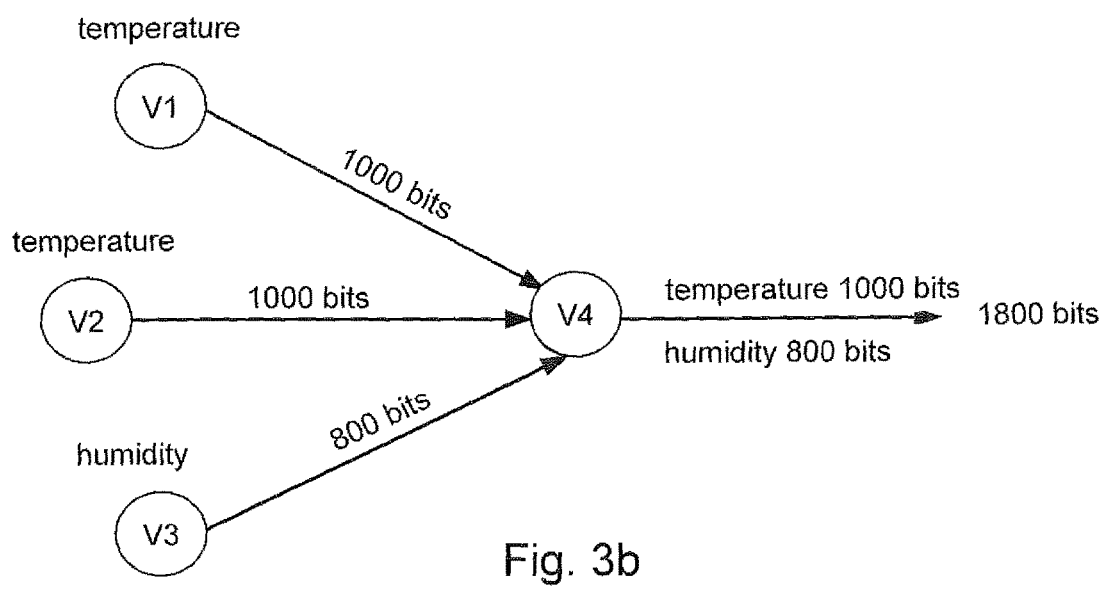
FIG. 3(b) illustrates a further example of routing in the network of FIG. 2.

FIGS. 3a and 3b illustrate specific examples of the approach taken in this embodiment, with respect to four nodes of the network V1 through V4. In the performance of this embodiment, it is assumed that data aggregation functions such as SUM, MAX, MIN, AVERAGE etc. can be performed on every node in the network (FIG. 3a). In the first example, illustrated in FIG. 3a, the three data source nodes V1, V2 and V3 are each running a temperature monitoring application. Hence a node $v_i$ (in this case V4) can aggregate multiple incoming messages together with its own messages (if $v_i$ is also a source node), into a single outgoing message.

However, it is assumed that only messages from the same application can be aggregated. As shown in FIG. 3b, one of the source nodes V3 is now shown running a humidity monitoring application. For a variety of reasons, different data types may not be easily processed and it may be impossible to do so in some cases. For example, it is not meaningful to calculate the average value of a data set comprising a temperature reading and a humidity reading.

In effecting the described embodiment, key to the performance is the embedding, in each node, an objective function. Depending on a probability p, the objective function is executed to rank and select the next hop node for forwarding different application traffic. Therefore, independent routing decisions are made by each node using only local information. For each data type k, the next hop node j is chosen by the objective function F which is described in Equation 1:

$$F = \max_{j \in N}\left(g'_j - g''_j + \beta \frac{L'_j - L''_j}{L'_j}\right) \quad \text{(Equation 1)}$$

Where the first term $g'_j - g''_j$ is the marginal processing gain which calculates the normalized communication data reduction via aggregation; the second term $$\frac{L'_j - L''_j}{L'_j}$$

is defined as the normalized local lifetime gain; and $\beta$ is a tuning parameter to provide weights between the two parameters.

In the following, each term will be described in further depth.

Marginal Processing Gain

In the above expression, the marginal processing gain is given as $g'_j - g''_j$ where $g'_j$ is the processing gain by allocating traffic k to Node j and $g''_j$ is the processing gain without allocating traffic k to Node j.

Here, the processing gain g is calculated as:

$$g = \frac{\sum_k R^k_{in\,j} - \sum_k R^k_{out\,j}}{R^k_{in\,j}} \quad \text{where} \quad \sum_k R^k_{in\,j} \quad \text{(Equation 2)}$$

is the total amount of incoming traffic for all applications k relayed via node j, and $$\sum_k R^k_{out\,j}$$

is the total outgoing traffic.

Hence, the part shown on the numerator of Equation 2 is the total amount of reduced traffic via the aggregation process on j and this value is then divided by the total incoming traffic.

There are two main reasons for this rationale:
1) It is a normalization process which makes it numerically comparable with the local lifetime gain (second term shown in Equation (1)). Hence, a hybrid gain can be computed.
2) For load balancing purposes: it is preferred to relay traffic to a node that can provide the same processing gain (reduce the same amount of data), but with less traffic than is already assigned to it. So, with the same traffic reduction amount, the more incoming traffic a node has, the smaller processing gain it can obtain.

Figure 4A:
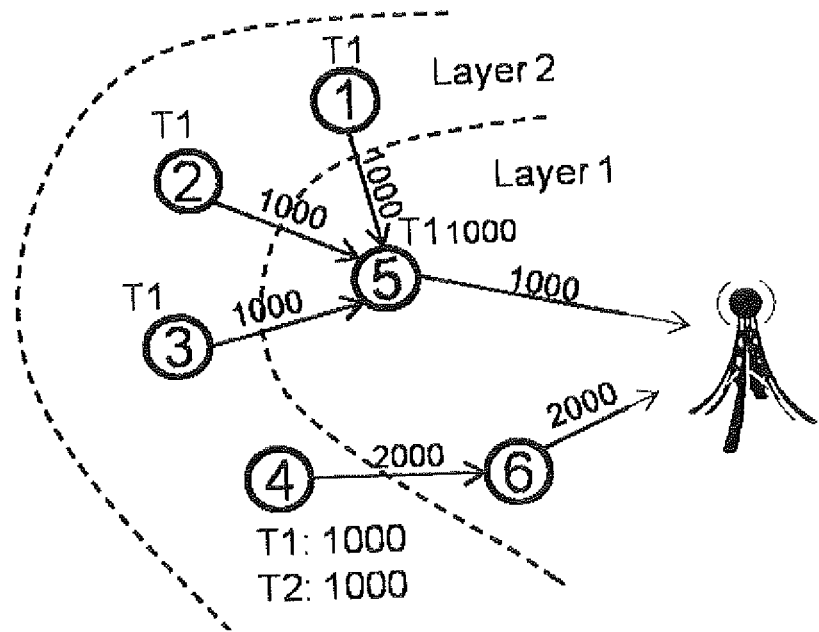
FIG. 4(a) illustrates an example of routing in the network of FIG. 2.
Figure 4B:
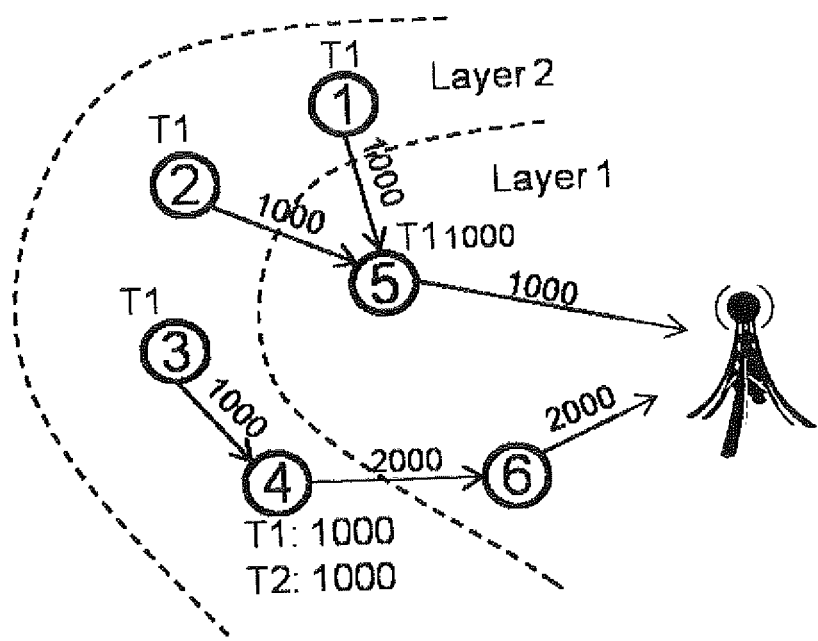
FIG. 4(b) illustrates a further example of routing in the network of FIG. 2.

Worked examples of the above approach are illustrated in FIGS. 4a and 4b. In each of these examples, two applications (T1 & T2) are collecting data in a network formed by 6 nodes. Nodes 1, 2, 3, 4 are the source nodes of T1 and only Node 4 is providing information for application T2.

Now, Node 3 is executing the objective function to determine which node should forward its traffic.

The arrangement shown in FIG. 4a suggests relaying traffic from node 3 via node 5, while the arrangement shown in FIG. 4b suggests relaying traffic from node 3 via node 4. Applying the formulations above to the situation, the following calculations arise:

Scenario a

Marginal processing gain of relaying traffic type T1 from Node 3 to Node 5 is:

$$g''=(3000-1000)/3000=2/3$$

$$g'=(4000-1000)/4000=3/4$$

Marginal processing gain=$g'-g''=1/12$

Scenario b

Marginal processing gain of relaying traffic type T1 from Node 3 to Node 4 is:

$$g''=(2000-2000)/2000=0$$

$$g'=(3000-2000)/3000=1/3$$

Marginal processing gain=$g'-g''=1/3$

Clearly, in this example, Node 4 (scenario b) will be selected as it has a better processing gain. This decision can be evaluated further by directly observing the traffic on each of the communication link for both cases. Although they have exactly the same amount of communication traffic on each link, Node 5 in scenario a is a bottleneck node as it needs to receive and process most of the traffic for T1. By contrast, scenario b provides a more balanced solution.

However, if a node is equipped with more energy, in principle it can relay and process more information compared with those with less energy on board. Yet, the load balancing functionality in the processing gain function cannot reflect the heterogeneous node energy levels. Therefore, another parameter is added into the objective function set out in equation (1), known as the local lifetime gain.

Local Lifetime Gain

As noted above, the local lifetime gain is expressed as $$\frac{L'_j - L''_j}{L'_j},$$

where $L'_j$ is the local lifetime by allocating traffic k to Node j and $L''_j$ is the local lifetime without allocating traffic k to Node j;

where the local lifetime L is calculated by:

$$L = \min_{j \in N} \frac{E_j}{e_j} \quad \text{(Equation 3)}$$

where $E_j$ is the residual battery energy on node j; $e_j$ is the total energy consumption on node j including the cost of data aggregation, reading and writing information in the flash, as well as transmitting and receiving data; and N is the number of candidate nodes from which the next hop node is selected.

Thus, if a Node j is the bottleneck node which has the lowest lifetime in the local region, further assigning more traffic to that node inevitably decreases the local network lifetime which also affects the overall network lifetime. Hence, in this case, a penalty is added to the objective function by the local lifetime gain function. On the other hand, if some messages are redirected away from the bottleneck node, a reward is given. Hence, load balancing is achieved by not only considering the distribution of dynamic traffic flows but also heterogeneous battery energy levels in the network.

Rather than building a centralized overlaid tree structure for multiple applications or re-constructing each routing topology once network condition changes, a more robust way is to have a distributed decision making approach where each node decides the next hop relay based on the local information.

Figure 5:
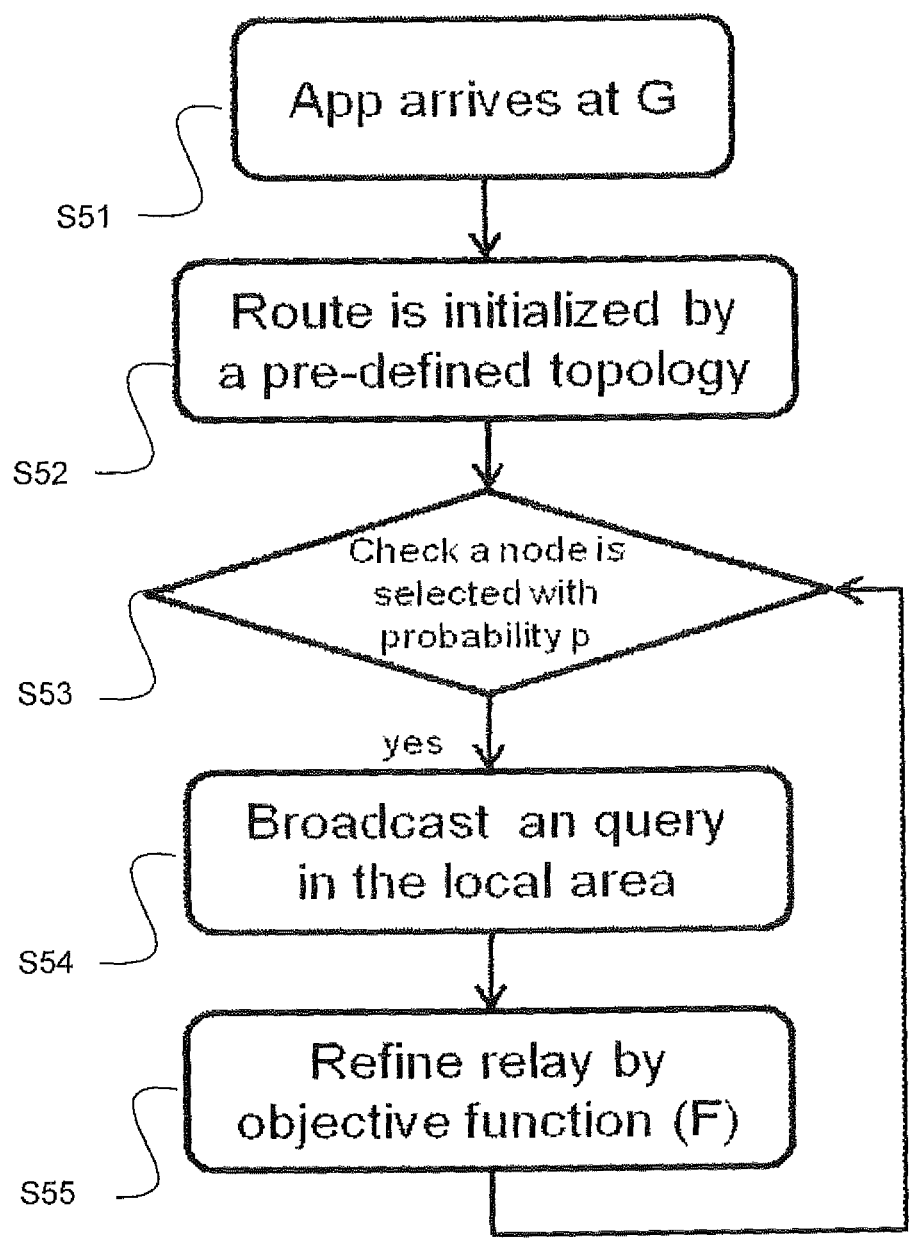
FIG. 5 illustrates a flow diagram of a method performed by a node of the network in FIG. 2, in making a routing decision.

The operation of this embodiment is described in FIG. 5. Once an application arrives at the gateway (S51), a pre-optimized or default routing structure is used (S52) to collect data. However, each node j has a probability p to refine its next hop relay by executing the objective function F (S53). A local query message is broadcast (S54) in the local region with its layer ID, and only its one-hop neighbouring candidates that have the same or lower layer ID will replay the query with a report message consisting of its incoming traffic and outgoing traffic information along with the node battery energy level. For each traffic type, candidate nodes are ranked by F and the one with the highest ranking is selected to relay the corresponding traffic (S55).

The frequency of executing F is determined by the probability p. However, if there is no data produced on or relayed by node j, p becomes 0. Nevertheless, if new traffic appears at node j, this process continues.

Communication loops can cause many problems in multihop M2M networks such as traffic congestion, packet loss (due to Time-To-Live expiry), and additional energy consumption through the repeated processing and transmission of looping messages. Therefore, in order to resolve this problem, a reply-back constraint can be added to the local query message, such that only qualified neighbouring nodes can answer this query.

A Time-To-Go-Forward (TTGF) quantity is defined, which is an integer value representing a count to force general progress of a communication from outer layers of a network towards the intended sink. The use of this quantity in the following approach will illustrate how TTGF affects this progress.

In this embodiment, three rules are specified for the objective node to generate the query message:

1. Any parent node which has sent any application traffic to the objective node, cannot be the candidate for the corresponding traffic, unless no other qualified candidates can be found.
2. Any node with a higher layer ID compared with the objective node, cannot be selected as the candidate, unless there no other qualified candidates can be found.
3. When the Time-To-Go-Forward (TTGF) count has elapsed, only those with a lower layer ID can be the next hop candidate, unless there is no other qualified candidates can be found.

As will be understood by the reader, the use of a TTGF quantity is similar to the concept of Time-To-Live (TTL), a bit which is added to the header of the query message. In short, if a sender has the same or lower layer ID than the recipient, the TTGF count is reduced by one. If multiple messages with different TTGF values are aggregated to a single message, the smallest TTGF value is used after the data aggregation. The TTGF value is set to default (often as a positive integer), if a successful forward relay transmission (higher layer→lower layer) has been made.

Figure 6:
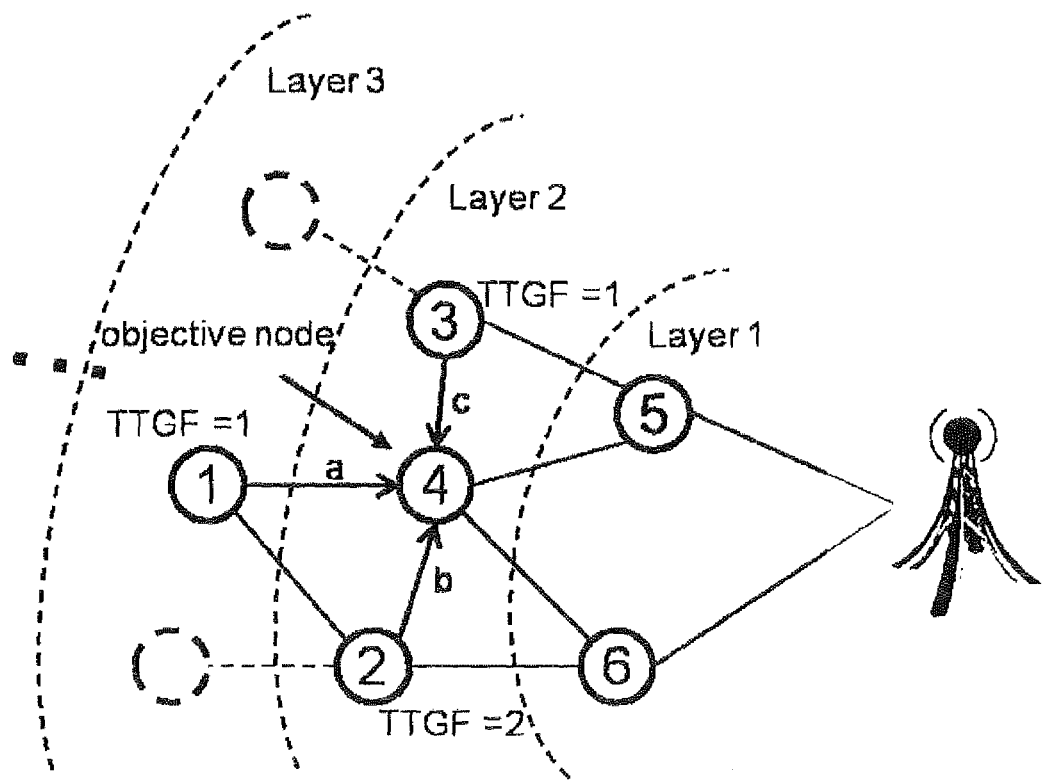
FIG. 6 illustrates a further example of routing in the network of FIG. 2.

Worked examples of the above approach are illustrated in FIG. 6, which illustrates a portion of the network, with a first node (marked 1) in communication with various other nodes (marked 2 to 6) and thence to a base station or gateway.

Three events are identified as events (a), (b) and (c). Event (a) comprises a communication from node 1 to node 4, and then a decision as to which node to use for onward transmission. Event (a) represents a transmission from layer 3 to layer 2. The next hop can comprise a communication to any of nodes 2, 3, 5 and 6, as indicated.

Hence, TTGF is set to default (in this case, default=1) and all the one hop neighbouring nodes in the same or lower layer can be the next hop candidate.

Event (b) comprises a communication from node 2 to node 4. In this case, after the TTGF value is reduced by 1 at the objective node, it is still larger than 0. Thus, neighbouring nodes in the same layer are still eligible for the next hop selection. Hence, apart from Node 2 (which is the parent node of event (b)), nodes 3, 5 and 6 will compete to be the next hop relay.

Finally, event (c) comprises a hop from node 3 to node 4, with the TTGF being set at 1. Since the TTGF of case (c) becomes 0 at Node 4, only those with a lower layer ID (Node 5 and 6) are qualified for candidate selection and to relay the query message.

Thus, by using TTGF, a message that, in a particular hop, has not been forwarded any "closer" to the sink, is forced to do so by selecting a lower layer node as the next hop candidate. Meanwhile, other mechanisms such as TTL can also be used such that a loop message can be discarded.

The embodiment as described herein offers the potential to improve the lifetime of the network by integration of distributed computing and load balancing technologies.

With distributed processing and data aggregation, the total number of communication messages are significantly reduced, hence conserving limited energy resources. In addition, a balanced routing decision by considering dynamic traffic flows and remaining node energy levels can avoid forwarding heavy traffic to bottleneck nodes. Therefore, a longer network lifetime can be achieved.

Independent routing decisions are made by each node using local message gossiping. Thus, it is robust to network dynamicity and also scalable to large-scale networks.

The above described embodiment, which is hereinafter referred to as "Content centric and load-balancing aware dynamic data aggregation" (CLADA) can be evaluated via simulation and compared with a pre-optimized but static tree topology (STree), and the conventional centralized processing method (Central), where only the sink processes data.

Figure 7:
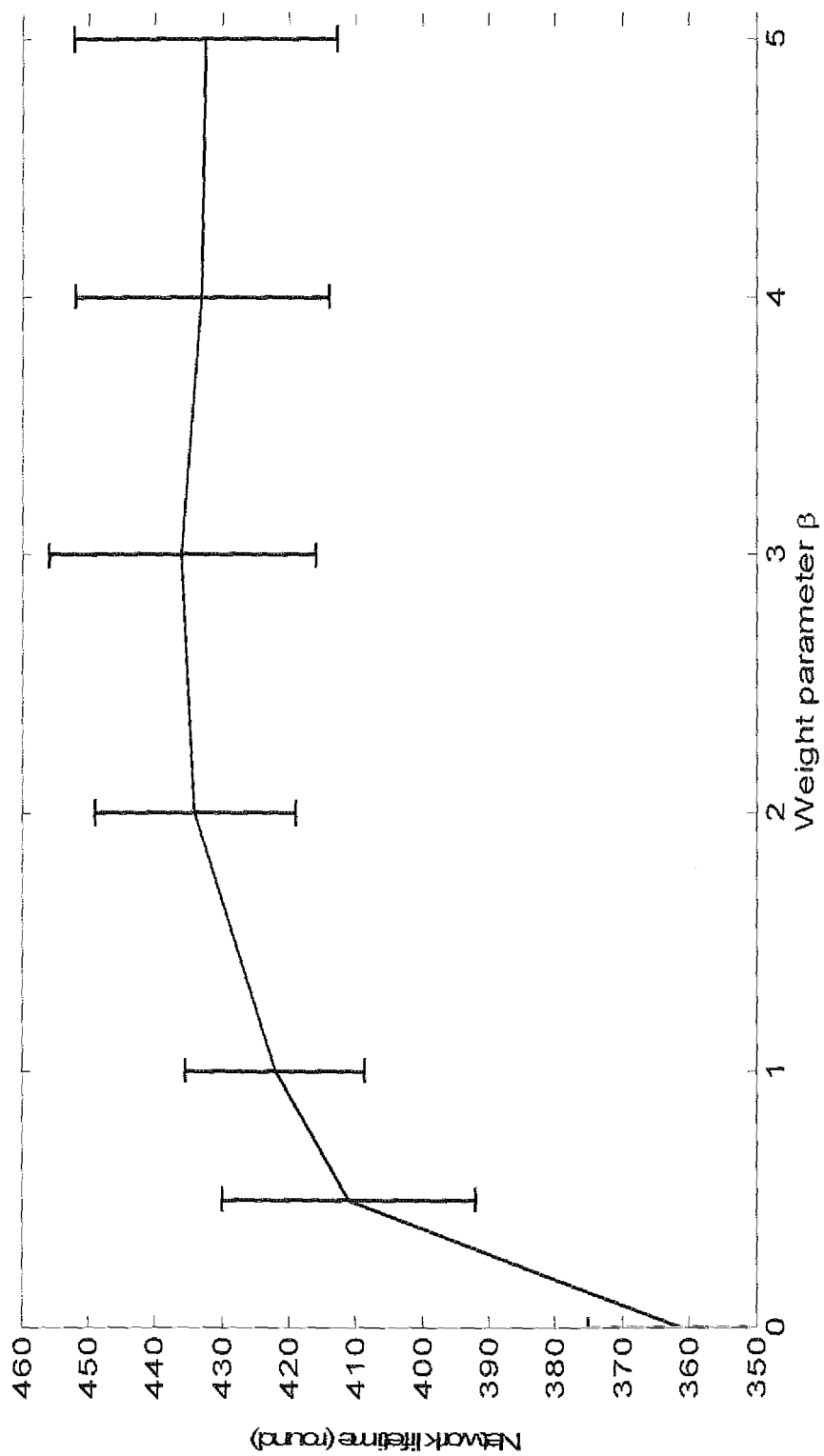
FIG. 7 is a graph showing performance of network lifetime with respect to variance of a weighting factor used in the abovementioned embodiment.

The effect of the weighting factor β will now be discussed. FIG. 7 illustrates a graph showing the effect of β on network lifetime, for a typical network operating in accordance with the described embodiment. As can be seen, larger values of β apply more weight to the local lifetime gain in calculating the objective function, which consequently produces a smaller value of the output of the objective function for a bottleneck node. Hence, this will create a tendency for avoidance of further allocation of communications to the bottleneck node, which would otherwise shorten the local lifetime. However, as can be observed, above a certain limit in the value of β, the impact of increasing β is markedly lessened.

Figure 8:
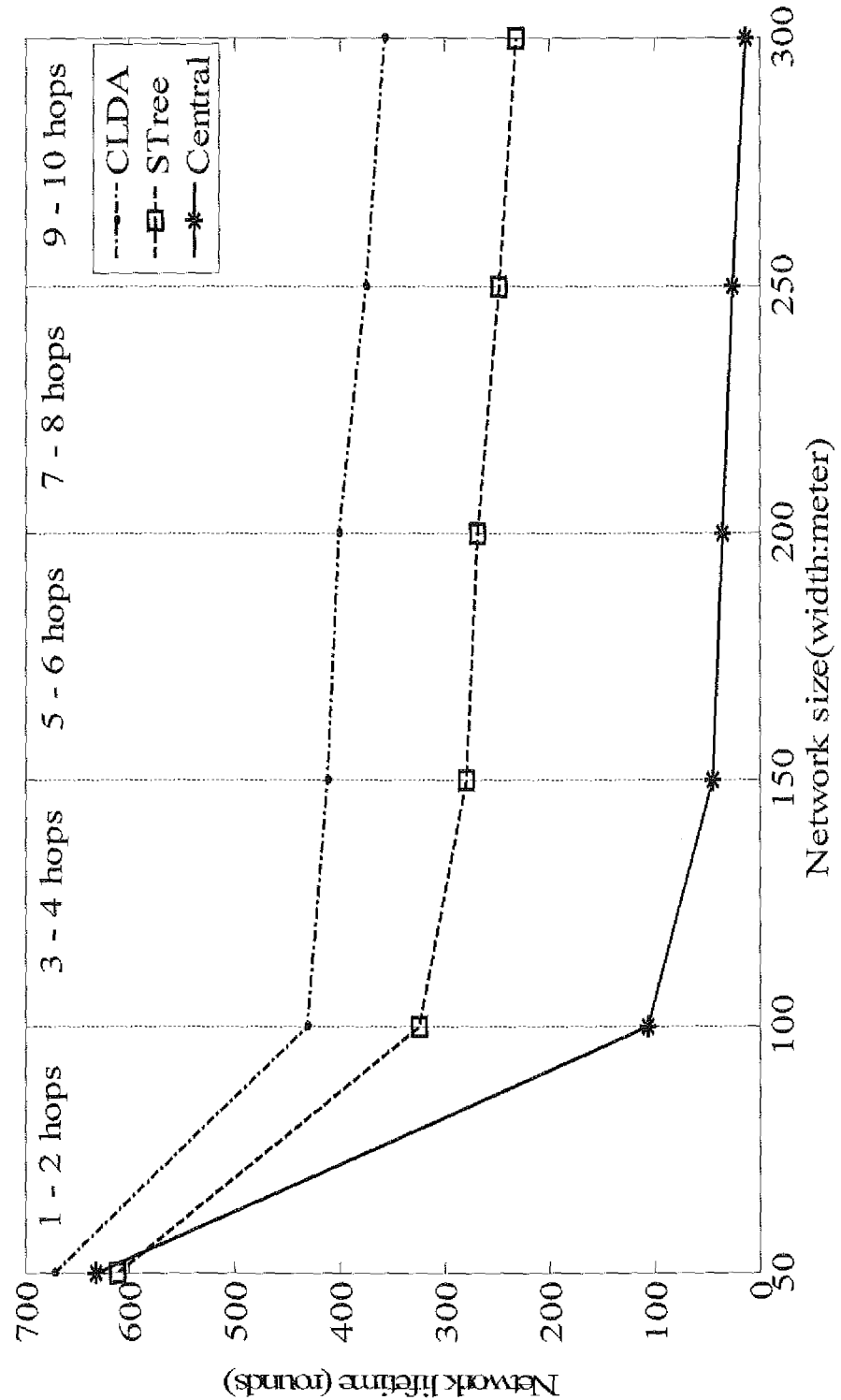
FIG. 8 illustrates a graph of performance of networks with respect to size, using an embodiment as described herein.

FIG. 8 shows the algorithms' performances in extending the network lifetime with different network scales. Node density is the same (0.0025 node/m²). When the network width increases to 100 meters, this requires about 3-4 hops for nodes in the farthest region to reach the sink. It can be observed that CLADA has about 30% network lifetime improvement compared with STree and is more than four times better than the Central approach. These performance gaps become even larger when the size of the network further increases.

Figure 9:
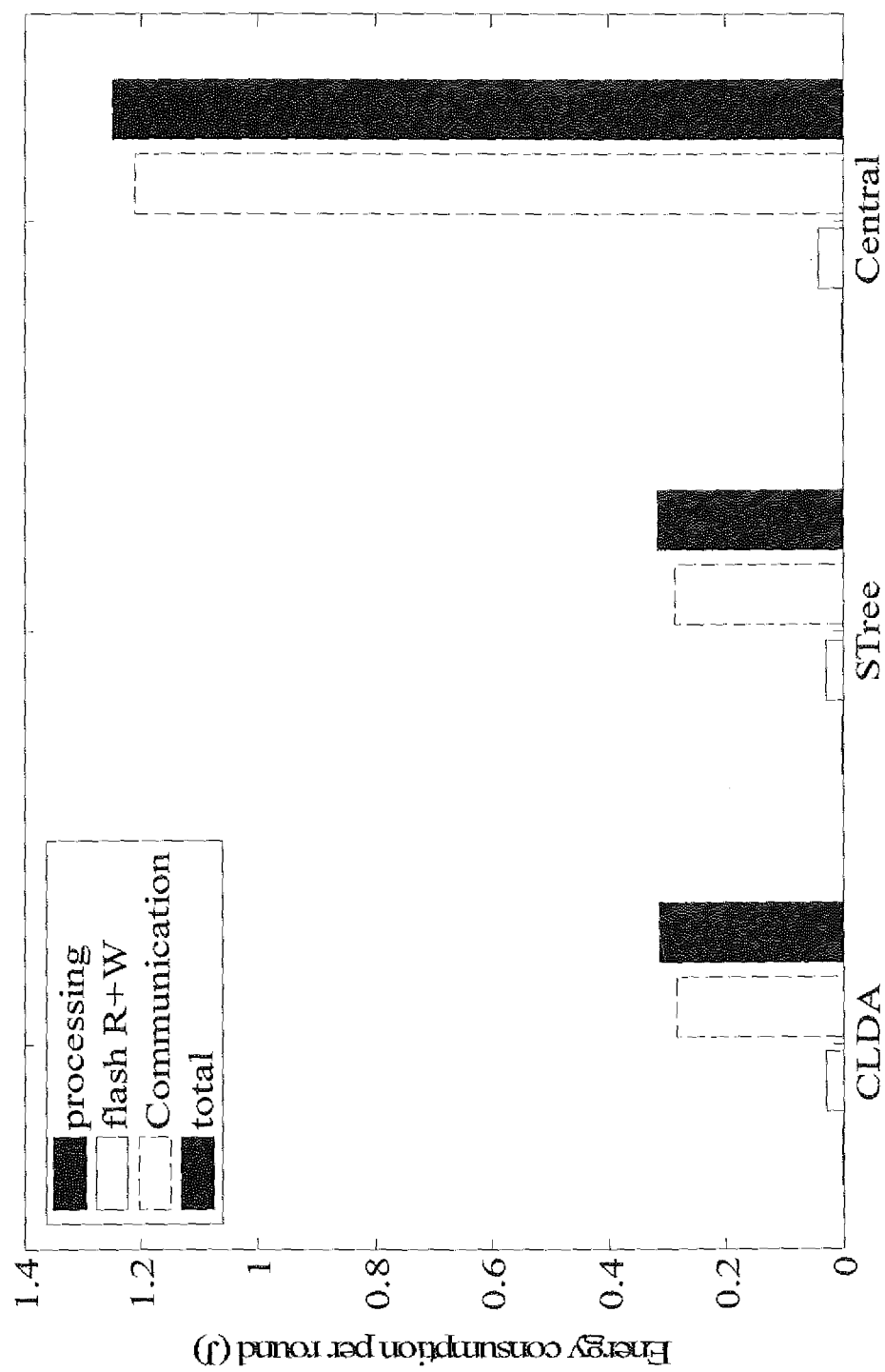
FIG. 9 illustrates energy consumption of an example of the described embodiment in comparison to prior technologies.

In FIG. 9, the per round total energy consumption of processing, Read and Write data in the flash, communication, and total cost, are illustrated. The network width is set to 200 meters with the same node density. It will be noted that the communication part dominates the total energy consumption. Therefore, by taking advantage of distributed processing to reduce communication data volume, CLADA and STree save almost 75% of the energy consumption spent on communication compared with the Central method. Furthermore, the processing costs are too small to notify the differences. The costs of processing per round are listed below where CLADA and STree spent 92.1 µJ and 92.5 µJ, respectively, for distributed processing, while the Central approach has far fewer computation events involved with only half of the processing cost (42.1 µJ) compared with CLADA and STree. Nevertheless, the difference in processing is negligible in comparison with the communication part.

Figure 10:
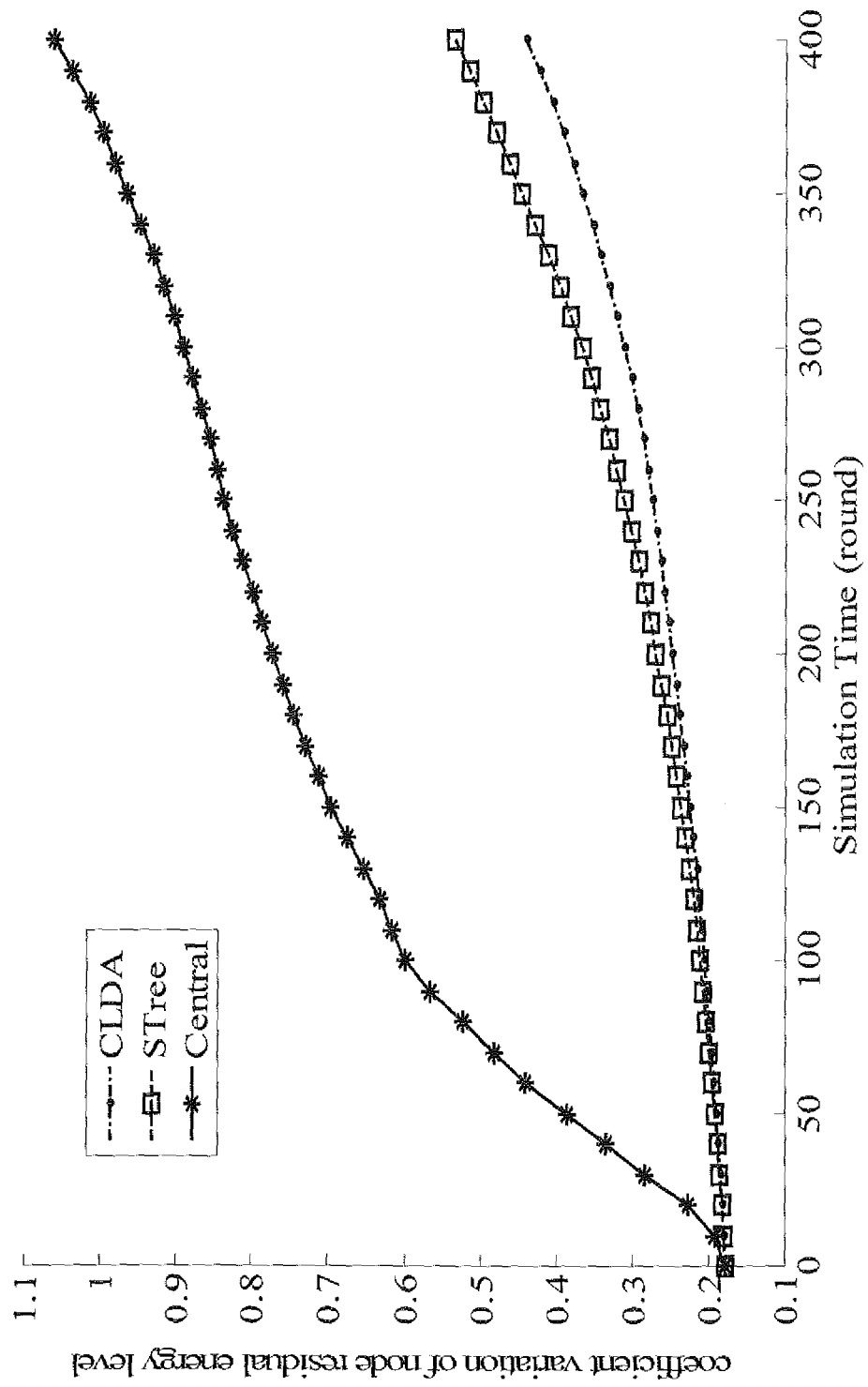
FIG. 10 illustrates a graph of coefficient of variation of node residual energy levels of an embodiment as described herein, with respect to prior technologies.

FIG. 10 indicates the coefficient of variation of node residual energy levels. A larger value represents a higher variation in node residual energy levels which implies a poorer load balancing. It can be observed that the described CLADA has a better performance in load balancing than both STree and Central. In addition, when simulation time passes, raw data generated from the source nodes change (e.g. arrival of a new application or termination of old ones), resulting in dynamicity in traffic flows. As a node using CLADA can refine its route by monitoring local traffic patterns, it shows a better performance against STree at later stages when substantial changes in communication traffic have taken place.

Figure 11:
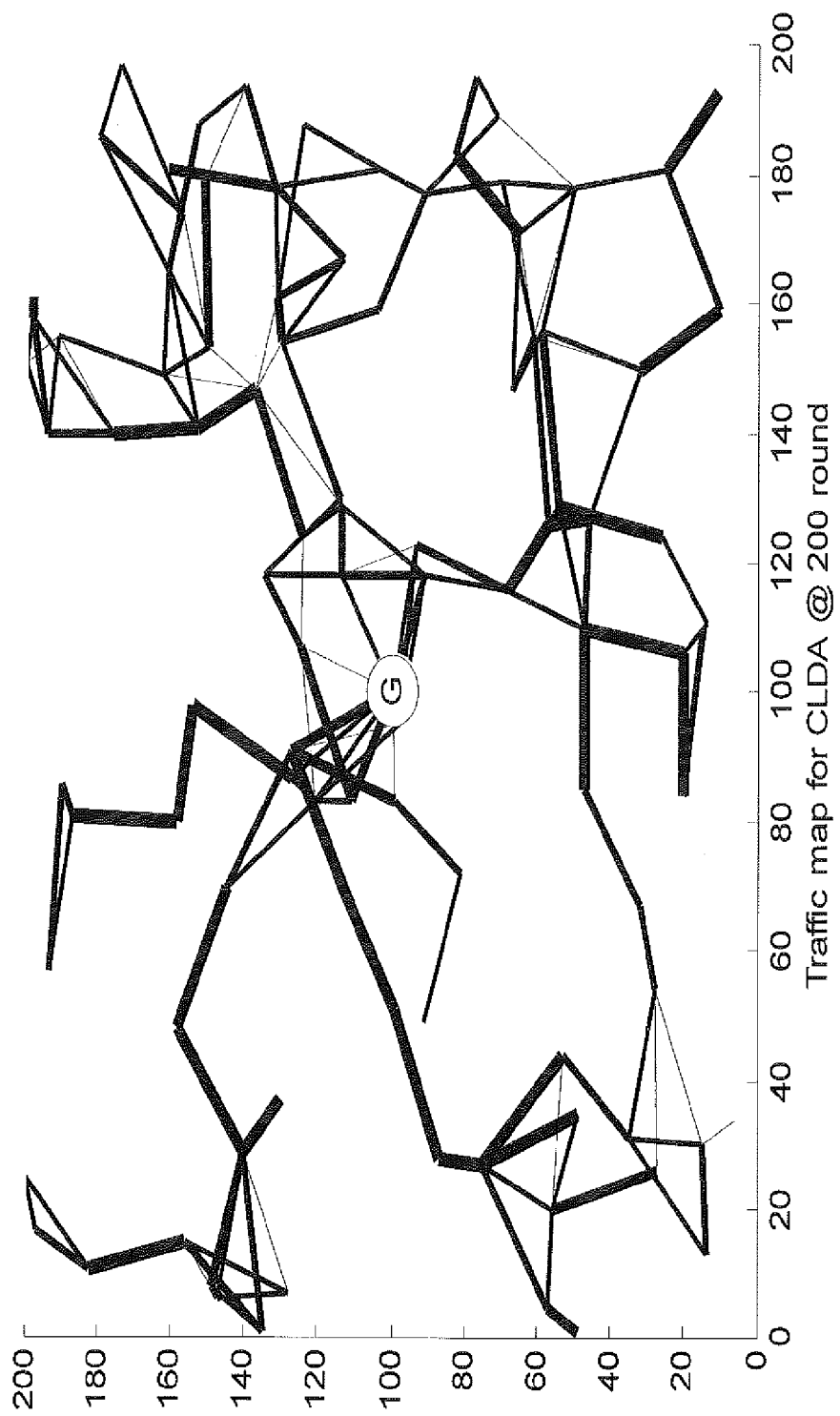
FIG. 11 illustrates a traffic map for an embodiment described herein.
Figure 12:
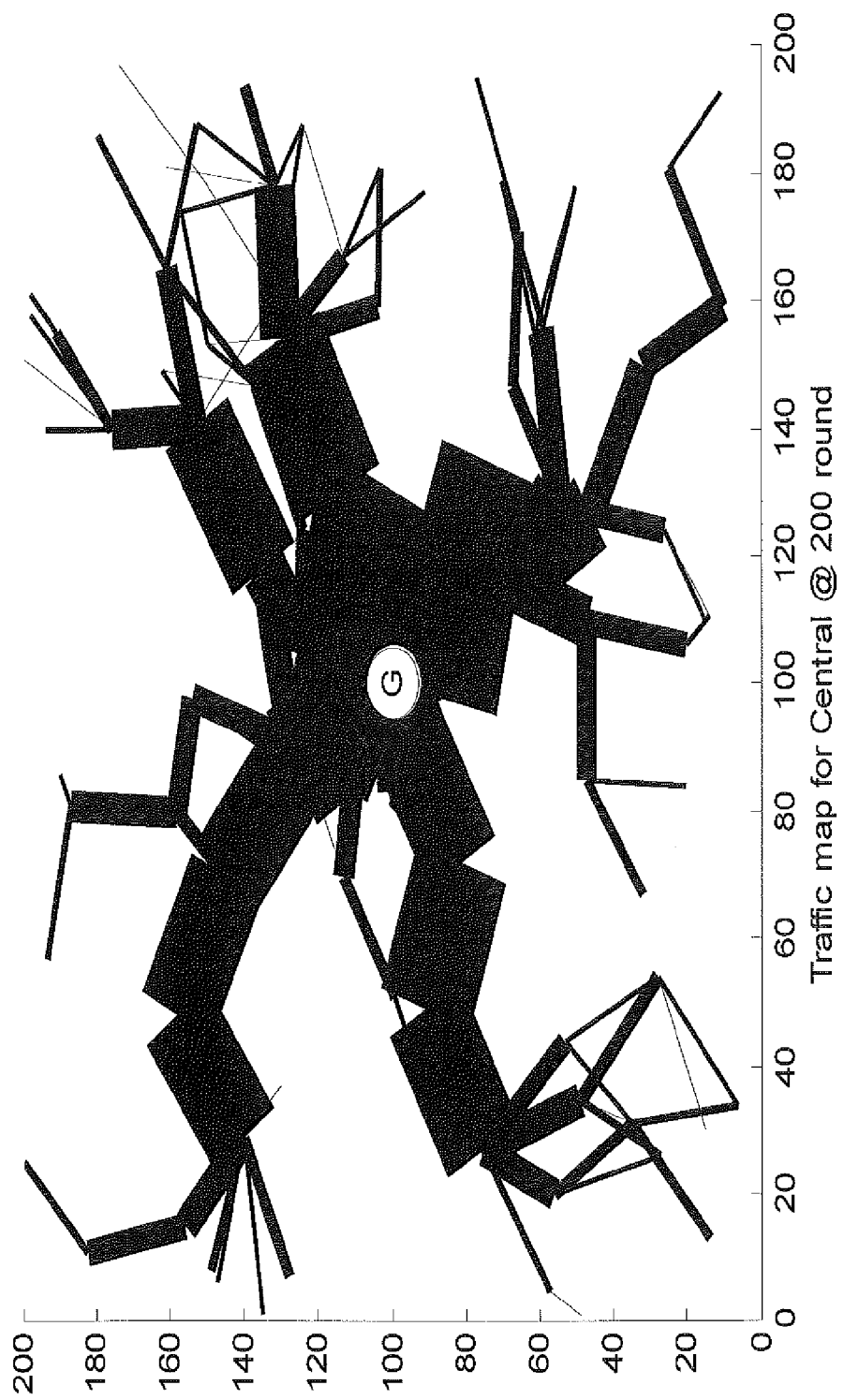
FIG. 12 illustrates a traffic map for an example of a prior technology.
Figure 13:
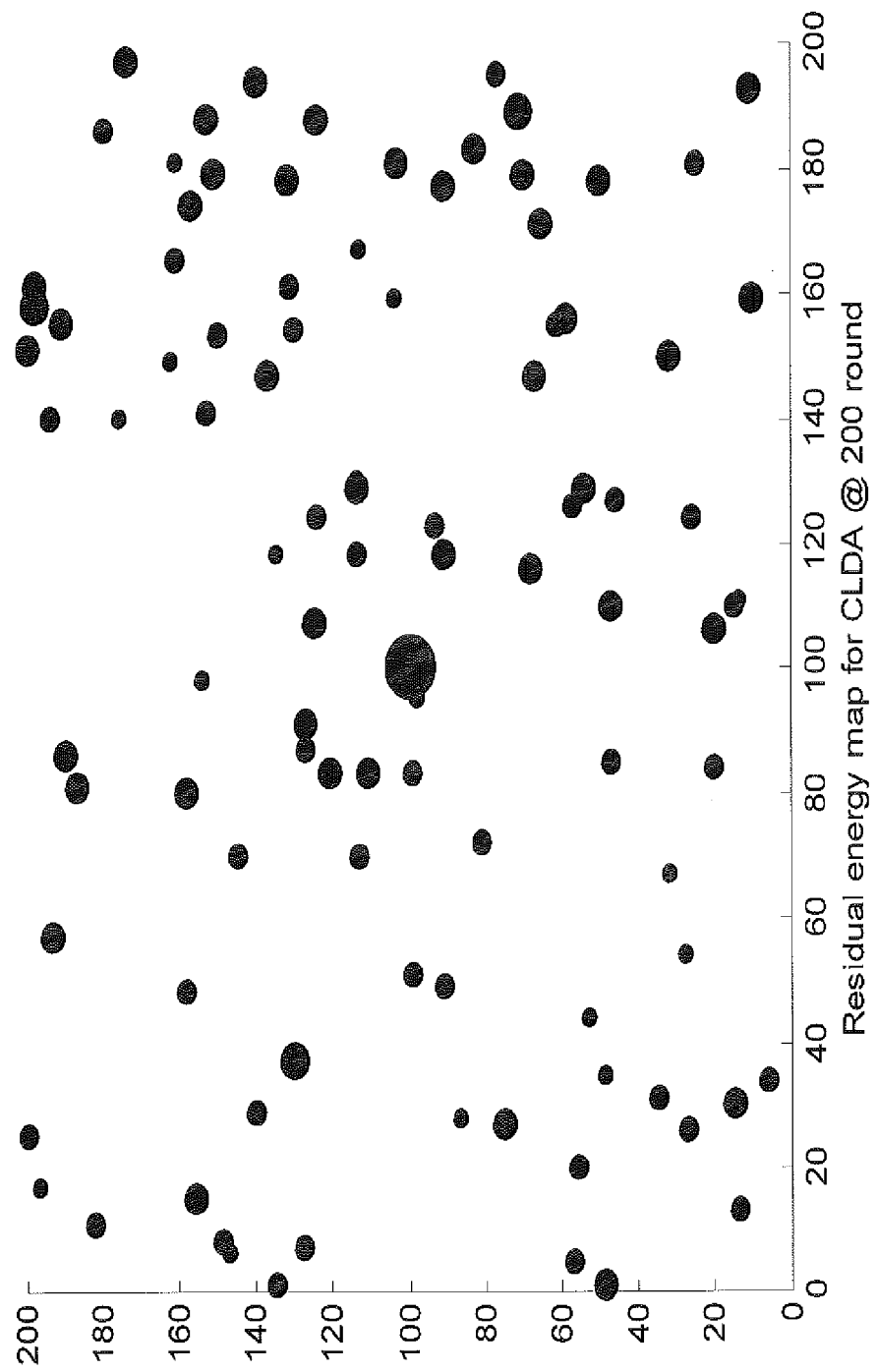
FIG. 13 illustrates a residual energy map for an embodiment described herein.
Figure 14:
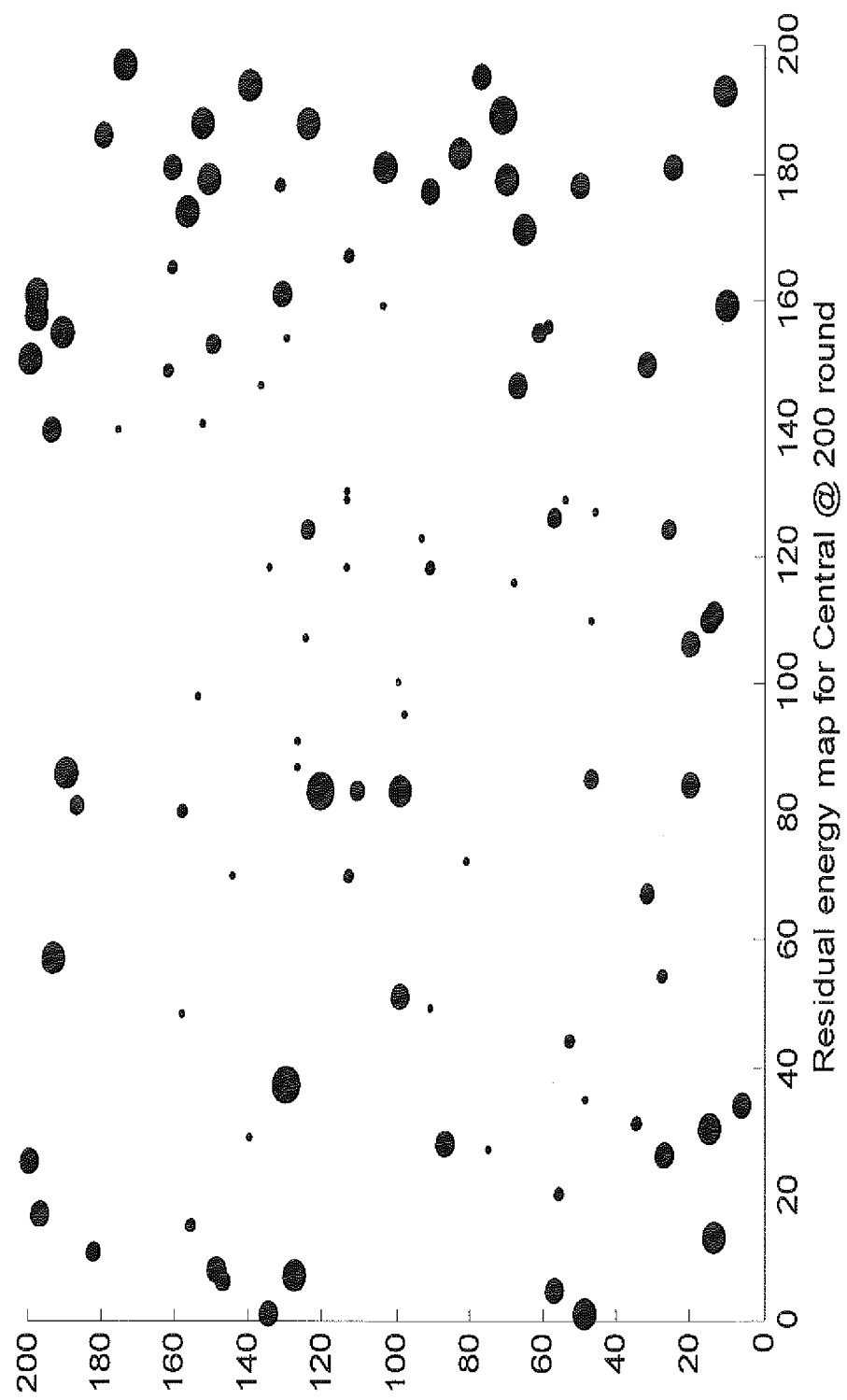
FIG. 14 illustrates a residual energy map for an example of a prior technology.

In FIGS. 11 to 14, visualized comparisons are provided of a traffic map and a residual energy map for CLADA and Central. The line width in the traffic maps of FIGS. 11 and 12 represent how much data is flowing via that link, while the dot size in the energy maps of FIGS. 13 and 14 indicates corresponding node battery energy levels. It can be seen that the Central approach has much heavier communication traffic compared with CLADA. In addition, since the nodes in the area that is closer to the sink need to relay information for those located in the outer regions, a large traffic level can be observed at the centre of the network for the Central method. This could easily cause a hot-spot problem. In contrast, CLADA has much less communication data volume after aggregation. Furthermore, by observing the residual energy map, it can also be observed that CLADA conserves more energy and has a more balanced energy consumption.

CLADA can be used to reduce communication traffic by aggregating correlated data, hence increasing the processing gain. CLADA may help to balance the energy-consumption among neighbouring nodes taking into account heterogeneous node residual energy levels which avoids early energy depletion of hot-spot nodes. However, CLADA does not consider communication link quality and assumes a perfect channel condition. In some circumstances, sending packets over poor communication links may waste energy on additional retransmissions due to packet loss. Therefore, it may be desirable to also take the communication reliability taken into account. Of course, energy-efficiency and communication reliability in multi-hop wireless M2M networks may themselves present conflicting objectives. That is to say, a route that provides the highest traffic reduction to save energy on wireless transmission may not be an ideal candidate for communication reliability purpose.

Figure 15:
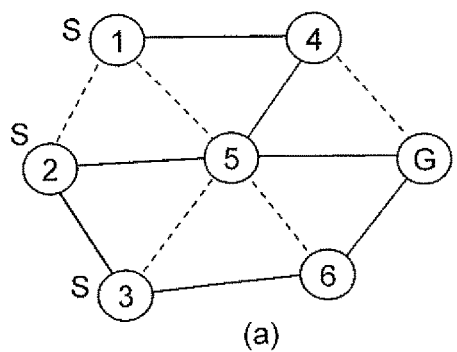
FIG. 15 illustrates different routing topologies that may be employed in networks when different factors are taken into account.
Figure 15:
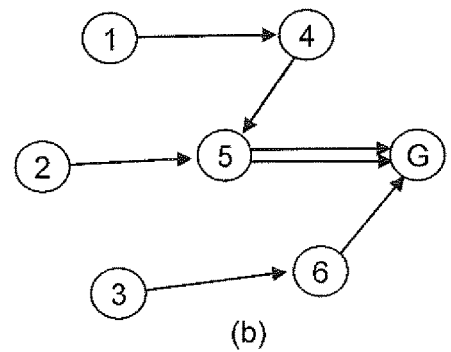
Figure 15:
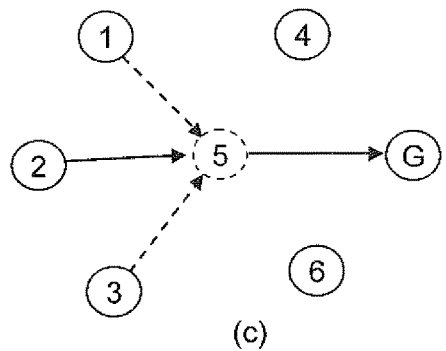
Figure 15:
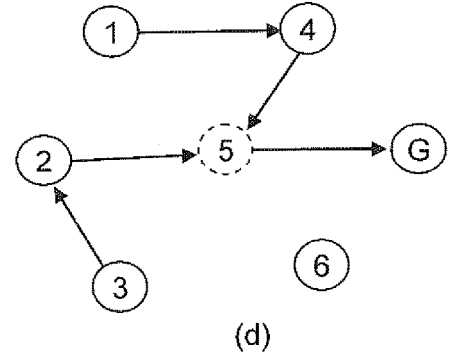

FIG. 15 provides an example of the impact these different considerations may have on the routing topology. FIG. 15(a) shows a network setup, which is formed by 6 nodes and 1 gateway node (labelled G). Here, it is intended to send traffic from the source nodes 1, 2, 3 (marked by S) to the gateway node (G). The lines between each pair of nodes in the network illustrate a communication link. Lines that are drawn as dashed lines are used to represent unreliable communication links. These links may be unreliable, due to the presence of obstacles between those nodes, or other sources of interference, for example.

FIG. 15(b) shows the routing topology adopted if the only consideration is communication reliability. FIG. 15(c) shows the routing topology that is adopted if the only consideration is energy saving by traffic reduction. FIG. 15(d) shows an example in which both energy efficiency and communication reliability are taken into consideration when building the routing topology.

As can be seen, the routing topology of FIG. 15(b) has a higher traffic amount compared to that shown in FIGS. 15(c) and 15(d). In contrast, thanks to efficient data aggregation the network illustrated in FIG. 15(c) has the smallest traffic amount. However, in this case, traffic is still sent over two unreliable communication links (i.e. from node 1 to 5, and node 3 to 5, respectively), which may result in problems such as packet loss, as well as the need to expend additional energy for retransmitting data from nodes 1 and 3 to node 5. FIG. 15(d) shows a solution in which data is forwarded via reliable links to proper nodes where they can be aggregated. It follows that it is desirable to provide an intelligent algorithm that can find a balance between energy efficiency, processing efficacy and communication reliability.

A further embodiment will now be described in which the channel/link quality is explicitly considered in order to appropriately estimate the local network lifetime when making routing decisions. In this embodiment, a modified objective function is introduced that not only considers traffic reduction gain by content-centric data aggregation, but also aims to route each communication unit (e.g. a packet) over reliable communication links. Hence, a low packet drop rate and long network lifetime can be achieved. In addition, a simple but effective communication loop control scheme is proposed to promote distributed processing and to save energy spend on communication by traffic reduction.

The present embodiment provides an efficient data aggregation and reliable delivery scheme that can significantly extend the network lifetime thereby providing savings on network maintenance and cutting down on the costs of node redeployment. The algorithms described herein can be implemented in a wide range of wireless networks for data collection purpose, such as wireless ad hoc, sensor networks.

The main objective of the presently described embodiment is to build an overlaid content-centric data aggregation topology on reliable communication links, and to optimize each content information flow and communication topology in order to efficiently route and process different types of data in lossy wireless networks.

The present embodiment is a logical extension of the earlier described embodiment, and is referred to herein as Link quality Aware Content-centric Data Aggregation (LACDA). As discussed below, the present embodiment introduces a new objective function with link quality aware local lifetime estimation, a content and context aware dynamic probability to execute the objective function, and a next hop candidate selection mechanism to avoid communication loops.

LACDA is a distributed approach, whose operation is described as below. Once an application request arrives at the gateway, a default routing structure is first used to collect data, for example to use RPL which forms a DAG topology. Then each node has a dynamic probability p to refine its next hop relay by executing the objective function F.

Figure 16:
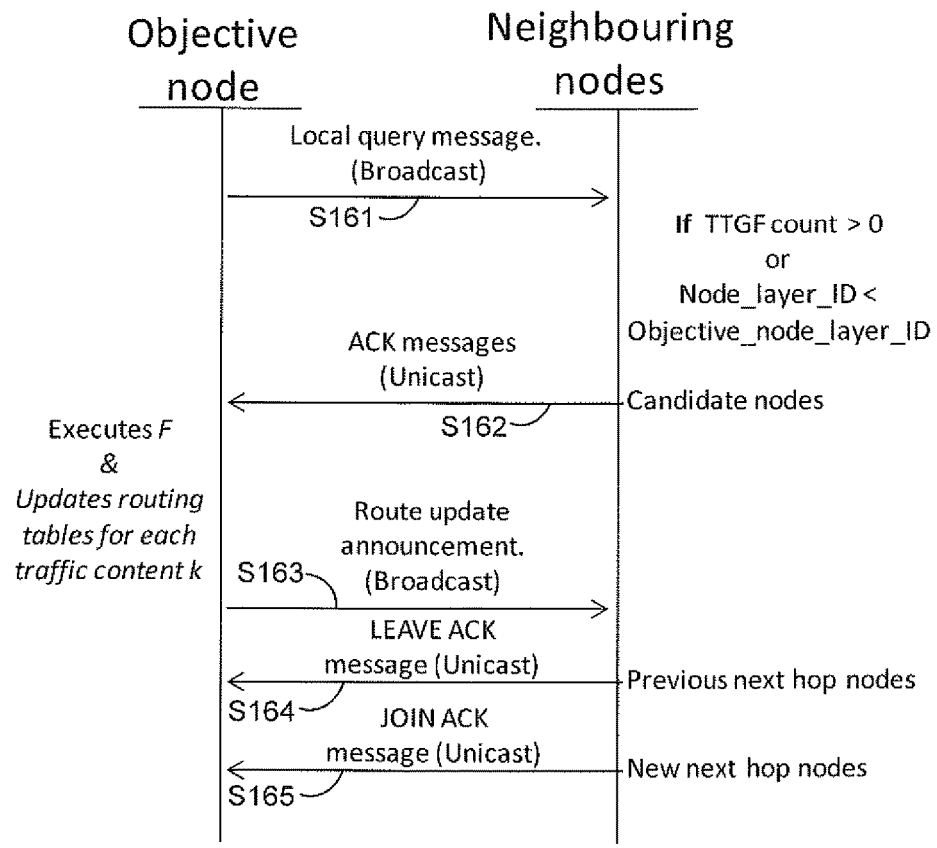
FIG. 16 illustrates a sequence of message signals exchanged between nodes in an embodiment described herein.

FIG. 16 shows an example of a sequence of message signals exchanged between the objective node (i.e. the node that intends to execute the objective function F) and its respective neighbouring nodes. In step S161, the objective node broadcasts a local query message to its one-hop neighbouring nodes. The query message comprises the objective node's outgoing traffic content types and corresponding traffic volume, and the candidate selection criterion (e.g. TTGF bits, as described later on). The qualified next hop candidates respond to the objective node with respective ACK messages (step S162). Each ACK message contains information required by F such as the responder's ID, and the estimated node lifetime of the responder in the event that the designated traffic is sent to that node. The objective node can use the information contained in the ACK messages to calculate the objective function for each neighbouring node. In so doing, the objective node establishes candidate rankings for the different nodes and selects the node having the highest ranking to relay the corresponding traffic. In step S163, having selected the node to relay the corresponding traffic, the objective node updates the routing table and broadcasts a route update announcement message containing the new next hop node ID for that traffic content. The previous relay nodes send LEAVE ACK messages (step S164), while the new next hop nodes reply with JOIN ACK messages (step S165). In this way, an overlaid tree topology for multiple traffic content types can be updated dynamically.

In a dynamic network environment, most routing protocols periodically update their routing information and keep the routing table up to date. Doing so, however, incurs additional control overheads. In resource constrained networks such as low-power and lossy networks, signalling messages should be controlled in order to conserve limited on-board node energy. In the present embodiment, the frequency of executing the objective function at a time t is controlled by a probability p(t). The probability is calculated independently on each node and does not require any local or global network information. The probability p(t) is defined in Equation 4 below:

$$p(t) = \min\left(\sum_{t_1}^{t} |\Delta_k| \times p_{default}, 1\right) \qquad \text{Equation (4)}$$

Figure 17:
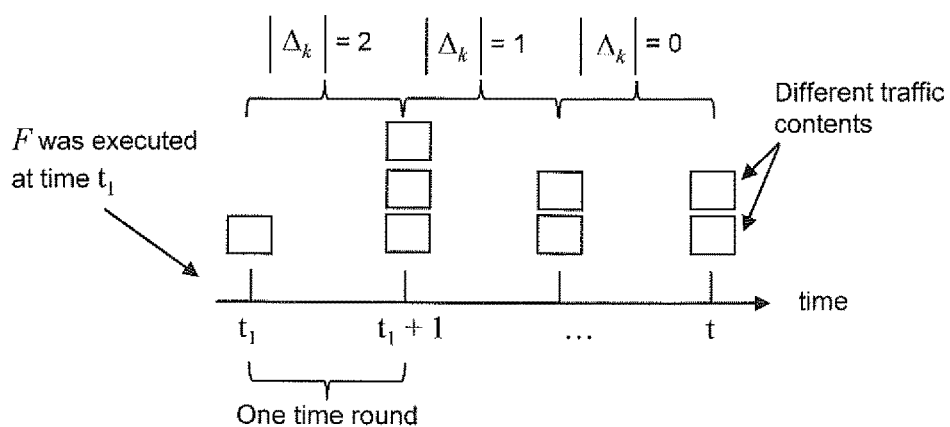
FIG. 17 illustrates how the type of traffic content received at a node in a network may vary over time.

Here, $\Delta_k$ is the traffic content variation of each node at a time round (a "round" being a basic time unit); t is the current time interval, $t_1$ denotes the last time interval when the node ran the objective function and $P_{default}$ is a pre-optimized probability. FIG. 17 shows an example of how $\Delta_k$ may be calculated at different intervals in time.

Figure 18:
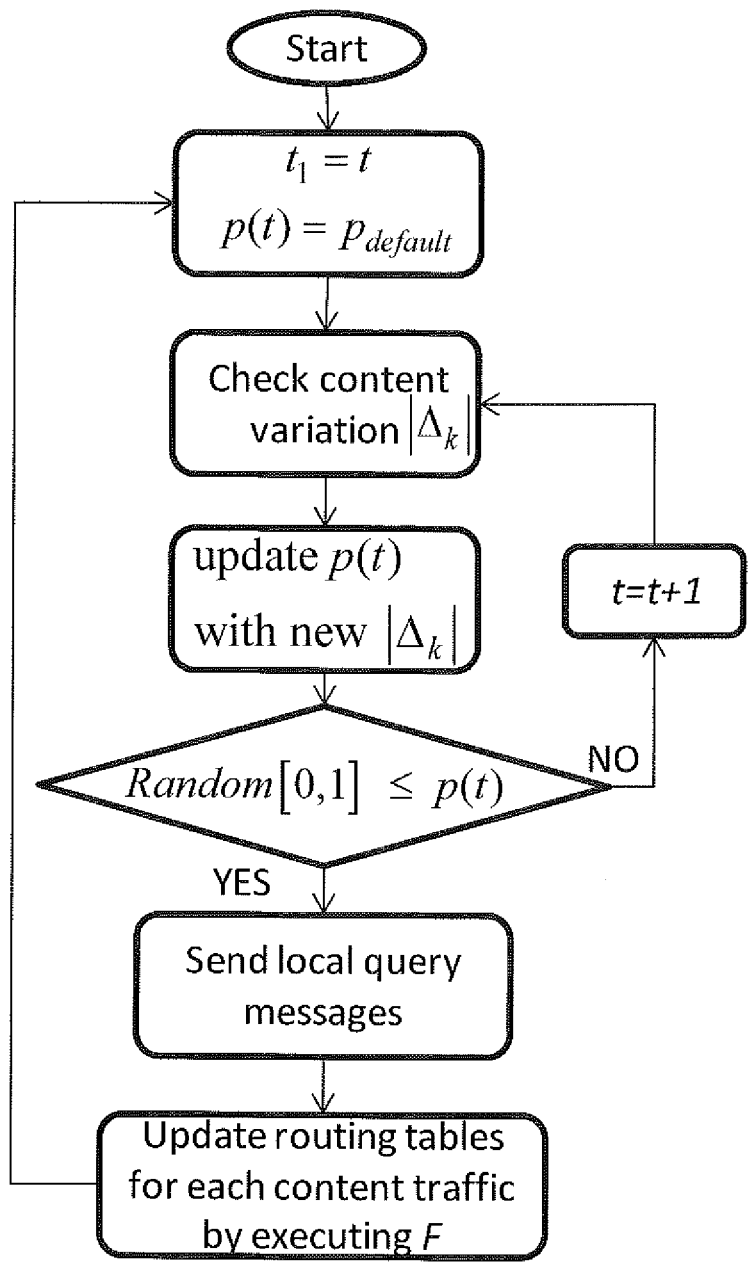
FIG. 18 shows a process by which a node determines whether or not to re-evaluate its choice of neighbouring node for relaying data, according to an embodiment described herein.

FIG. 18 shows a flow chart illustrating how the value of p(t) at a given time interval t will determine if the objective node executes the objective function at that time interval. The probability of executing the objective function increases if a large value of $\Delta_k$ is produced due to traffic content variation. On the other hand, when the network stabilizes and $\Delta_k$ is small, the probability p decreases. The probability p may even reach 0 if no changes occur, which effectively reduces control overhead. If a node doesn't run the objective function for a sufficiently long period of time, accumulation of small content variation can also result in an increase in the value of p over time and eventually trigger the node to execute the objective function. Once this happens, $t_1$ is set to t and p(t) is set back to $P_{default}$. Doing so ensures that even in a slow changing environment, the routing table is still kept up to date. As can be seen, the probability of executing the objective function is much lower in a stable network compared to a dynamically changing one.

In the present embodiment, the objective function F is executed on an objective node i in order to find out the most suitable next hop node j for each traffic type (content) k among N neighbouring candidates. Since the traffic is differentiated by its content type, the objective node may construct a different routing table for each content k by executing the objective function.

The new objective function F is described in Equation 5, which is based on the function shown in Equation 1 of the CLADA embodiment.

$$F = \max_{j \in N}\left(g'_j - g''_j + \beta \frac{\hat{l}_j - l_{j^*}}{\hat{l}_j} + \xi^k_j\right)$$ (Equation 5)

As in the CLADA embodiment, the first term $g'_j - g''_j$ is the processing gain as hereinbefore defined and β is the weighting parameter. There are two main differences for this new objective function, which are the link quality aware local network lifetime estimation and a new reward parameter $\xi^k_j$. Both of these will be discussed in detail below.

The reward parameter $\xi^k_j$ is introduced in order to accommodate the heterogeneous processing capability of nodes. Certain nodes, for example, may only be capable of processing specific types of content, due to hardware or software constraints, whilst other nodes may not be able to process any type of data. In such cases, the nodes simply act as relays without processing the received data. The reward parameter $\xi^k_j$ is used to give additional credit for nodes/that can process the corresponding content k. The value of the reward parameter is defined as follows:
$\xi^k_j = 0$, where Node j cannot process traffic content k; and
$\xi^k_j = \sigma$, where Node j can process traffic content k (σ being a constant)

The person skilled in the art will understand that the marginal processing gain in F already gives credit to a Node j that is able to process content k, provided that routing traffic k to that node j will reduce the amount of traffic k Therefore, even in the absence of the reward parameter $\xi^k_j$, traffic is more likely to be forwarded to nodes that are capable of processing the data in addition to merely relaying it. However, if a Node j has the capability of processing content k but there is currently no other traffic k routed via j, the processing gain is zero because there is no traffic reduction. In this instance, the reward parameter can help to ensure that traffic is still forwarded to that Node j.

Figure 19:
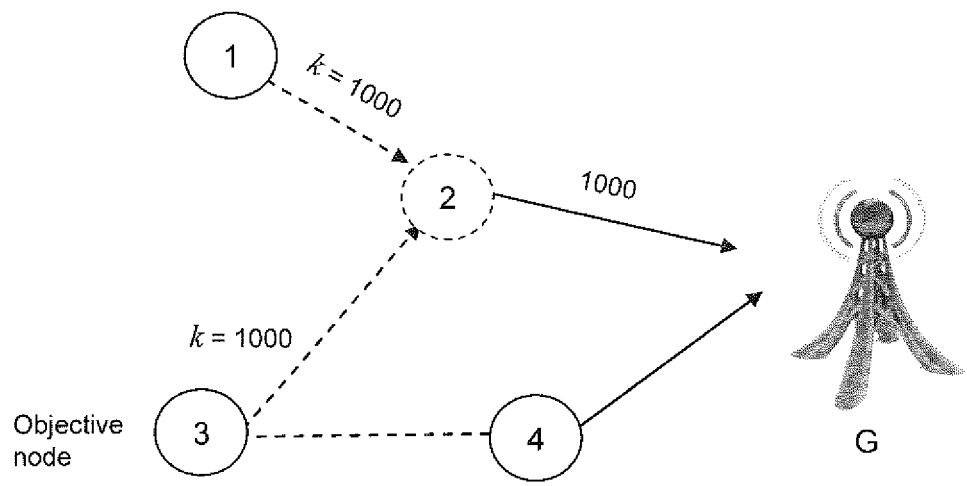
FIG. 19 illustrates how a reward parameter may be used to preferentially forward data to nodes that have the capability to process the data, according to an embodiment described herein.
Figure 19:
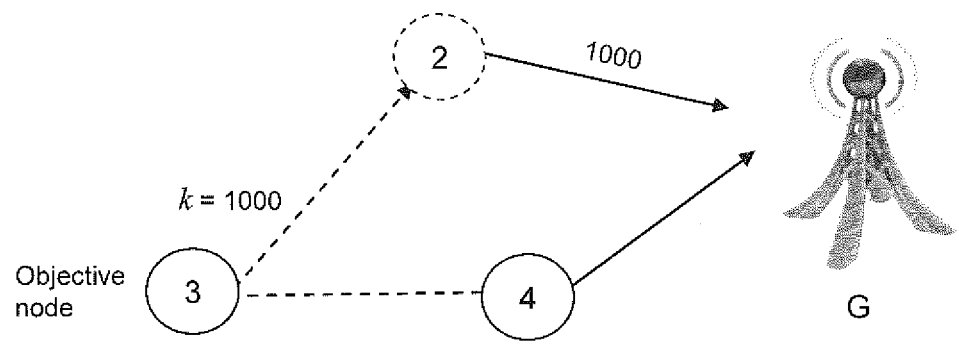

FIG. 19 provides an example of how the reward parameter can ensure that data is preferentially forwarded to nodes that have the capability to process the data, even where the marginal processing gain achieved by doing so is not that large. FIG. 19(a) shows a situation in which an objective node 3 wishes to send 1000 bits of traffic content k to a gateway node G. The objective node has the choice of sending the data via one of two relay nodes 2, 4. One of these nodes 2 is capable of processing content k (i.e. the node 2 can aggregate that type of traffic content with similar content received from other nodes in order to reduce the total number of bits that need to be relayed). For this reason, the node 2 is assigned a parameter ξ=0.05. In contrast, the other node 4 is capable only of relaying the traffic content k and does not have the facility to aggregate the data with similar data received from other nodes. Consequently, the reward parameter for the node 4 is set at 0. As shown in FIG. 19(a), the node 2 is presently receiving 1000 bits of traffic content k from another node 1, independently of the objective node.

The objective node 3 can execute the objective function in order to determine which one of the two nodes 2, 4 should be used to relay the traffic to the gateway node. Using Equation 5, the objective node will calculate the function $F_2$ for the node 2 as follows:

$$F_2 = g'_2 - g''_2 + \xi^k_2 = \left(\frac{2000-1000}{2000}\right) - \left(\frac{1000-1000}{1000}\right) + 0.5 = 0.55$$

(Note that for simplicity, in the example above, the link quality aware local network lifetime estimation is omitted from consideration).

Similarly, the objective function $F_4$ for the node 4 can be determined as follows:

$$F_4 = g'_4 - g''_4 + \xi^k_4 = 0 - 0 + 0 = 0$$

In this example, node 2 would still be selected as the next hop node, even in the absence of the reward parameter.

The same calculations can also be performed for FIG. 19(b), which shows a similar situation to FIG. 19(a), with the exception that the node 2 is no longer receiving data from any other nodes. In this case, the objective functions $F_2$ and $F_4$ return the following values:

$$F_2 = g'_2 - g''_2 + \xi^k_2 = 0.05$$

$$F_4 = g'_4 - g''_4 + \xi^k_4 = 0$$

In this case, in the absence of the reward parameter ξ, both $F_2$ and $F_4$ would return the same result of 0. By assigning the node 2 with a reward parameter of ξ, it is possible to ensure that the objective node still sends the data k to the node 2, where it has the potential to be processed or aggregated in future. Thus, although the value of σ could be relatively small compared to the other parameters in F, it provides a bias to forward traffic to nodes that are capable of processing the particular type of content in question.

Link Quality Aware Local Lifetime Estimation

Due to the dynamic nature of the wireless links, there are various link quality estimation methods. For example, ETX (Expected Transmission count) is a popular link quality/reliability parameter used in many routing protocols such as RPL. In essence, ETX defines the average number of transmissions required by a sender to successfully deliver a message to the destination. It can be shown that once SNR is above a threshold, the packet success rate will remain high regardless of the actual SNR value, and if SNR is lower than the threshold, packet success rate will drop drastically.

The ETX value of a link can be easily converted to the average amount of energy spent on transmissions per packet via that link. In this way, ETX can be used to assess the communication link quality, which can then be used to help estimate the local network lifetime. The person skilled in the art will appreciate that although the present embodiment utilises ETX in its calculations, other link quality measurement techniques can also be applied with simply modifications to the estimation function.

In the following, the local lifetime gain parameter $$\frac{\hat{l}_j - l_{j^*}}{\hat{l}_j}$$

in Equation 5 is explained.

Here, $l_{j^*}$ is the current local network lifetime among the objective node i and its N next hop candidates, and j* is the current selected next hop node. $\hat{l}_j$ is the estimated local network lifetime which assumes the content traffic is forwarded to a new candidate j rather than j*.

The local lifetime is defined as the minimum node lifetime among the objective node i and its N qualified neighbouring candidate nodes. Hence, $\hat{l}_j$ can be calculated as:

$$\hat{l}_j = \min\left(\min_{j \in N} \frac{E_j}{\hat{e}_j}, \frac{E_i}{\hat{e}_i}\right)$$

where $E_i$ and $E_j$ are the current battery energy for the objective node and the candidate node, respectively and $\hat{e}_j$ and $\hat{e}_i$ are the estimated energy consumption of the two nodes in the event that node j is selected as the next hop node to relay traffic k. The estimated energy consumption may, for example, take into account both the costs of processing and transmitting and receiving data.

By switching traffic k from the current next hop node j* to a candidate node j, the estimated new energy consumption $\hat{e}_i$ the objective node can be calculated based on its current energy cost $e_i^*$ (Equation 6):

$$\hat{e}_i = e_i^* - (ETX_i^{j*} - ETX_i^j) \times U \times e_t \quad \text{(Equation 6)}$$

where $ETX_i^{j*}$ and $ETX_i^j$ stand for the ETX value of the current link from node i to node j* and the new link from node i to node j, respectively. Since the present embodiment uses a distributed approach and considers only one-hop neighbours, the ETX value is also one hop based. The value U is the total amount of data sent by node i for traffic content type k (in bits), and $e_t$ is the energy consumption to transmit one bit of data.

Similarly, the estimated energy consumption $\hat{e}_j$ of each candidate node apart from j* can be calculated as:

$$\hat{e}_j = e_j^* + U \times e_r + U \times e_p + ETX_j^{nexthop} \times U_p \times e_t \quad \text{(Equation 7)}$$

Here, $e_r$ and $e_p$ are the energy consumption involved in receiving and processing one bit of data, respectively. $U_p$ is the amount of additional data after processing that the node j has to send to its next hop node. If the node j cannot process content k, then $U_p = U$.

Candidate Selection and Loop Avoidance

Communication loops can cause several problems in multi-hop networks such as traffic congestion, packet loss (due to Time-To-Live expiry), and additional energy consumed in repeatedly processing and transmission of looping messages.

In RPL, a message header is used to detect communication loops. In essence, RPL does not allow messages to route 'down' to a child node, if it is supposed to be sent 'up' to the root. If a loop is detected, the message is discarded and a local repair is carried out. However, such loop avoidance scheme limits the number of neighbours to be selected as the next hop relay. Consequently, this limits the possibility to perform distributed processing and to reduce the network traffic volume. In contrast, the LACDA approach allows converse traffic, provided a higher processing gain can be achieved within the TTGF tolerance range.

Figure 20:
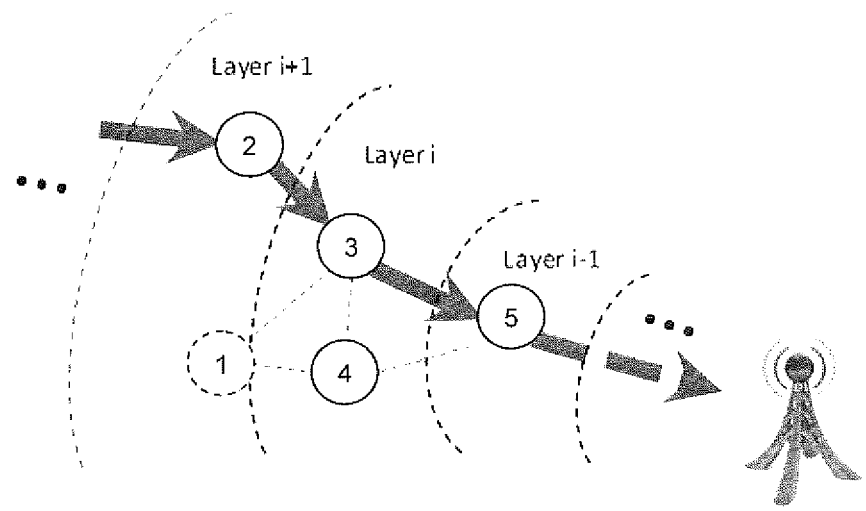
FIG. 20 shows a comparison between the path taken by traffic in a network using a conventional loop avoidance scheme and a network implementing a method according to an embodiment described herein.
Figure 20:
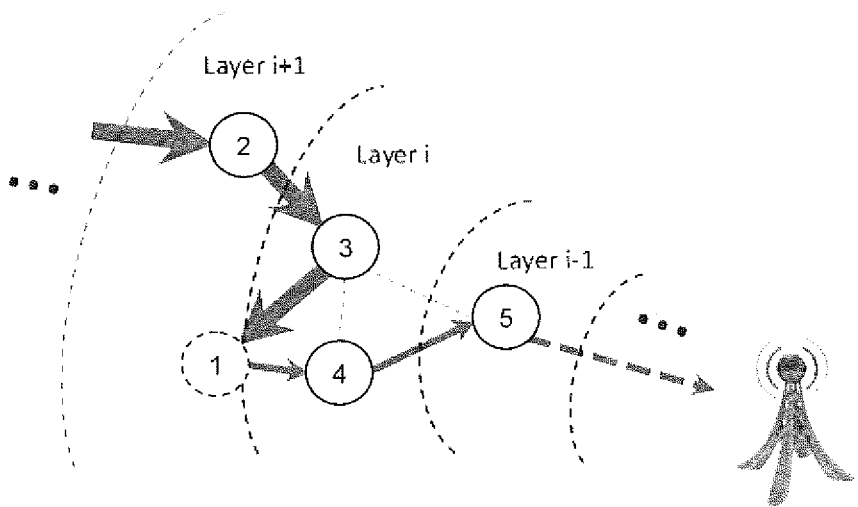
Figure 20:
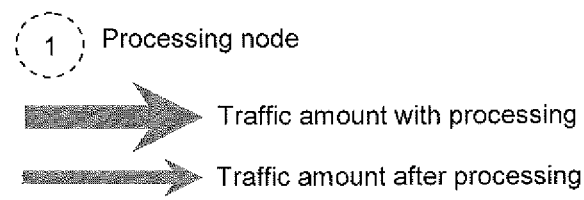

The difference between the LACDA approach and the conventional RPL scheme can be seen by comparing FIGS. 20(a) and 20(b). FIG. 20(a) shows the loop avoidance scheme employed in RPL, which does not allow converse traffic. Referring to FIG. 20(a), once data is sent from a first node 2 in a layer i+1 to a second node 3 in a lower layer i, the data cannot then be relayed via a third node 1 in the original layer i+1, regardless of any processing capability that the node 1 may possess. FIG. 20(b) shows the approach employed by LACDA in which converse traffic may be allowed. Here, it is recognised that processing of the data by node 1 will reduce the overall volume of traffic. Thus, the node 3 in the second layer i is permitted to relay data via the node 1 in the higher layer i+1.

In the present embodiment, the Time-To-Go-Forward (TTGF) constraint is redefined in order to select appropriate neighbouring nodes as candidate nodes to reply to the local query message and to avoid communication loops. As previously discussed, TTGF is a similar notion to the Time-To-Live (TTL) byte which can be added to the header of the data packet.

The TTGF works together with the node layer ID, which represents the minimum number of hops required for each node to reach the sink. TTGF contains two parameters: (1) the TTGF layer ID and (2) the TTGF count. The TTGF layer ID is a pointer pointing to the lowest node layer ID that a message has reached. The TTGF layer ID is updated when forwarding a message closer to the sink. If a successful forward transmission is made (i.e. the current/recipient node layer ID<TTGF layer ID), the value of the TTGF layer ID is updated to reflect the current node layer ID. The TTGF count works as a 'count down' parameter that biases the selection of candidate nodes to those that are located closer towards the sink. When a message is forwarded to a recipient node that has the same or higher node layer ID than that of the TTGF layer ID, the TTGF count is reduced by one. Once the TTGF count reaches zero, only those with a lower layer ID compared to the objective node's layer ID can be chosen as the next hop candidate. The TTGF count is reset to a default each time the TTGF layer ID is updated.

Thus, the modified TTGF protocol allows messages to be relayed to nodes within the same or even higher depth of the network layer within a certain tolerance value, such that a proper processing node can be found to aggregate data. On the other hand, if after a certain number of relay hops, a message still has yet to come any "closer" to the sink, the reduction in the count-down parameter forces the objective node to select a node in a lower layer as the next hop candidate.

Figure 21:
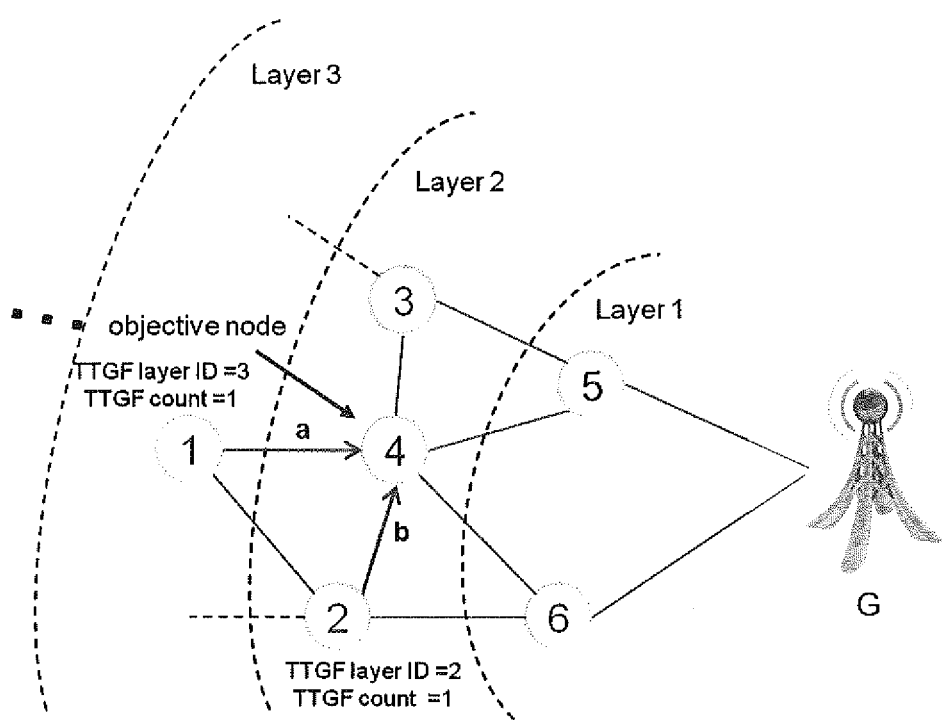
FIG. 21 illustrates an example of how a Time-To-Go-Forward (TTGF) protocol is implemented in an embodiment described herein.

An example of how the TTGF protocol may work in practice is shown in FIG. 21. In this figure, the network comprises nodes 1 to 6 and a gateway G. Node 1 is located in Layer 3 of the network, nodes 2, 3 and 4 are located in Layer 2, and nodes 5 and 6 are located in Layer 1. As shown in the figure, nodes 1 and 2 transmit respective messages a, b, to node 4, situated in Layer 2 of the network. In each case, the node 4 will execute the objective function in order to determine which of its neighbouring nodes offers the best candidate for relaying the message towards the gateway G.

As can be seen, for message a, the TTGF layer ID is set at 3 to begin with, reflecting the fact that node 1 is located in Layer 3 of the network. For message b, the TTGF layer ID is set at 2 to begin with, as node 2 is located in Layer 2 of the network. In this example, the TTGF count for both messages is initially set at 1.

On arrival at the objective node 4, the TTGF layer ID for message a is updated to 2, reflecting the change from Layer 3 to Layer 2. Since the TTGF layer ID is reduced, the TTGF count is reset to a default, which is usually a positive integer larger than 0. In this instance, any one of the one hop neighbouring nodes 2, 3, 5, and 6 may be considered as a next hop candidate for node 4.

For message b, the TTGF layer ID remains the same on transmission from node 2 to node 4. The TTGF count, therefore, is reduced by 1 to 0. As a result, only those with a lower layer ID (nodes 5 and 6) will qualify for the candidate selection and will reply to the query message sent by the objective node 4.

Simulations were carried out in order to evaluate the performance of the proposed algorithms with conventional methods. Unless otherwise specified, nodes were uniformly distributed in a network area with a node density of 0.005 nodes/m². The gateway node was deployed at the centre of the network area. Three applications with heterogeneous traffic rates were assumed. Each application had the same arrival probability 0.05, but with a randomly chosen operation duration between 100-200 rounds (a round being the basic time unit used in the simulation). Nodes were assumed to have unequal energy levels at the startup time in the range 4-6 J. The TTGF count was set to 2 and the control packet size was assumed to be 500 bits.

Figure 22:
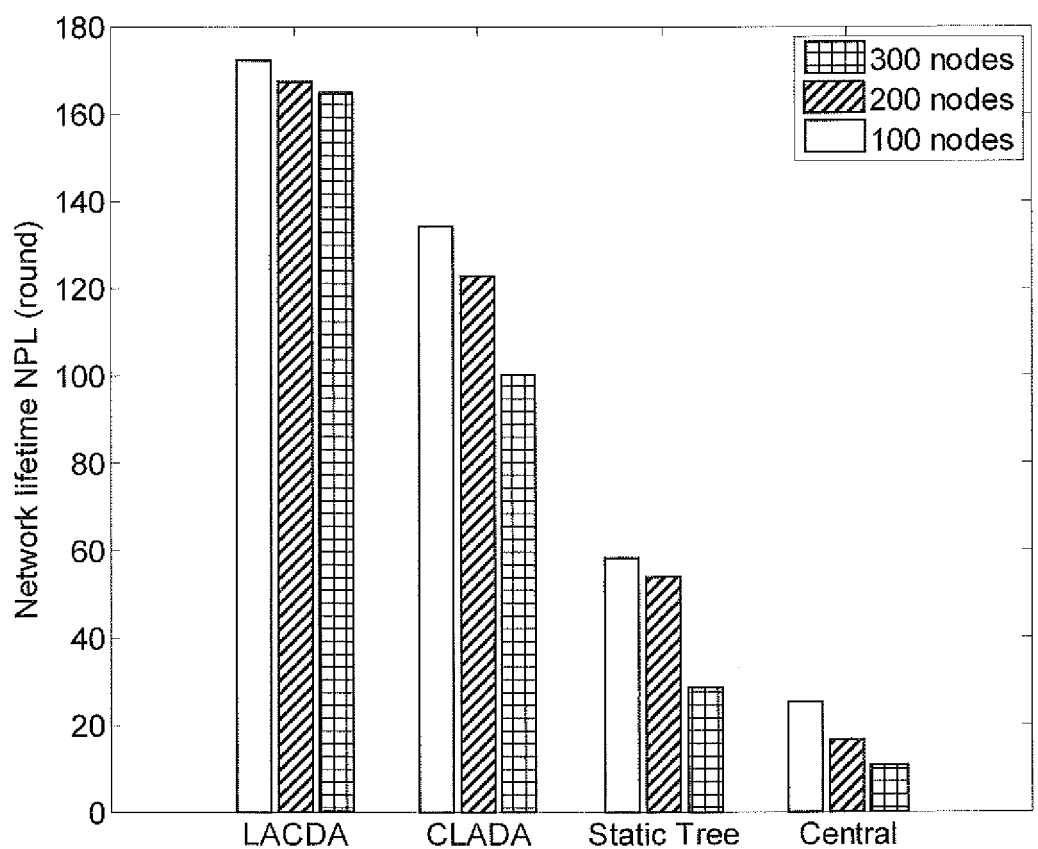
FIG. 22 illustrates the results of simulations comparing the network lifetime obtained by conventional approaches with that obtained using embodiments described herein.

In these simulations, both the proposed algorithms LACDA and CLADA were compared with a static but pre-optimized maximum lifetime tree topology "Static Tree" and a central processing mechanism "Central" without distributed processing. FIG. 22 illustrates the algorithms' performance in extending the network lifetime. A test parameter Network Partition Lifetime (NPL) is defined which is the period of time until a certain number of nodes in the network have diminished energy reserves and the link connections start to partition and fail to provide full network coverage. As shown in FIG. 22, both the CLADA and LACDA algorithms provide a significant increase in network lifetime compared to the conventional Static Tree and Central algorithms.

Figure 23:
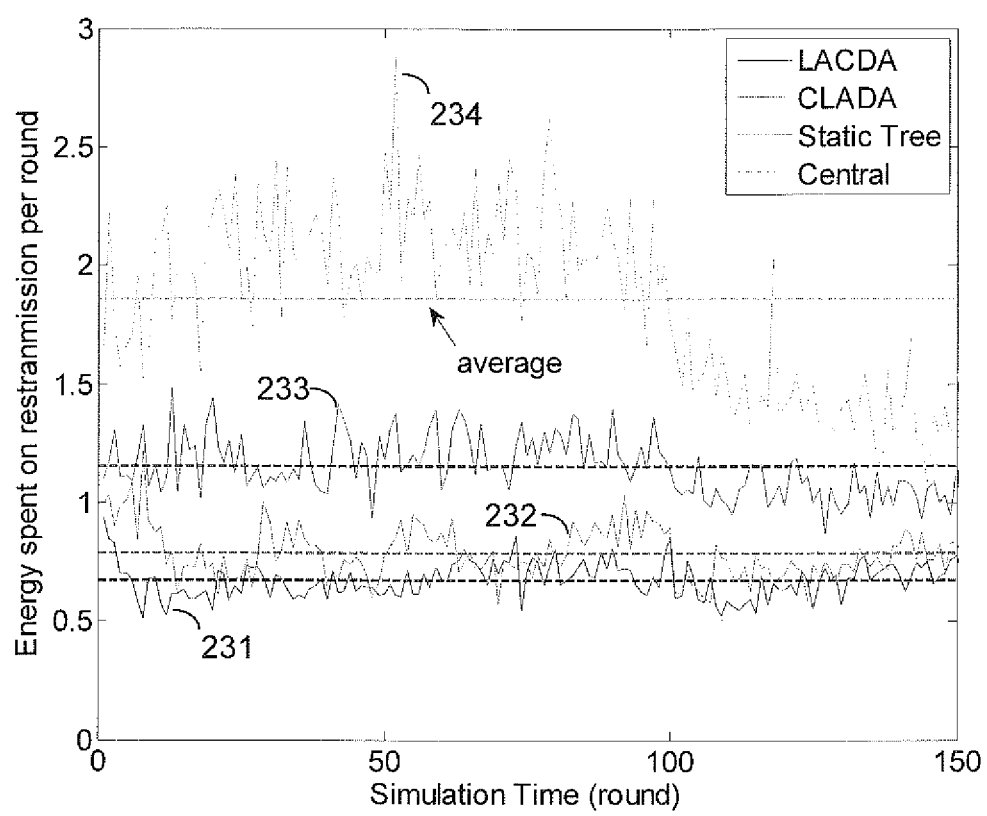
FIG. 23 illustrates the results of simulations comparing the average energy consumption spent on retransmissions per round in conventional approaches with embodiments described herein.

FIG. 23 shows the energy consumption spent per round on retransmissions for each approach. As can be seen, the LACDA algorithm 231 offers the best performance as it has the lowest average energy consumption for retransmission. The CLADA algorithm 232 also offers a significant reduction in the average energy spent on retransmissions, when compared to either the Static Tree approach 233 or the Central approach 234. That is to say, a more reliable routing topology is formed.

Figure 24:
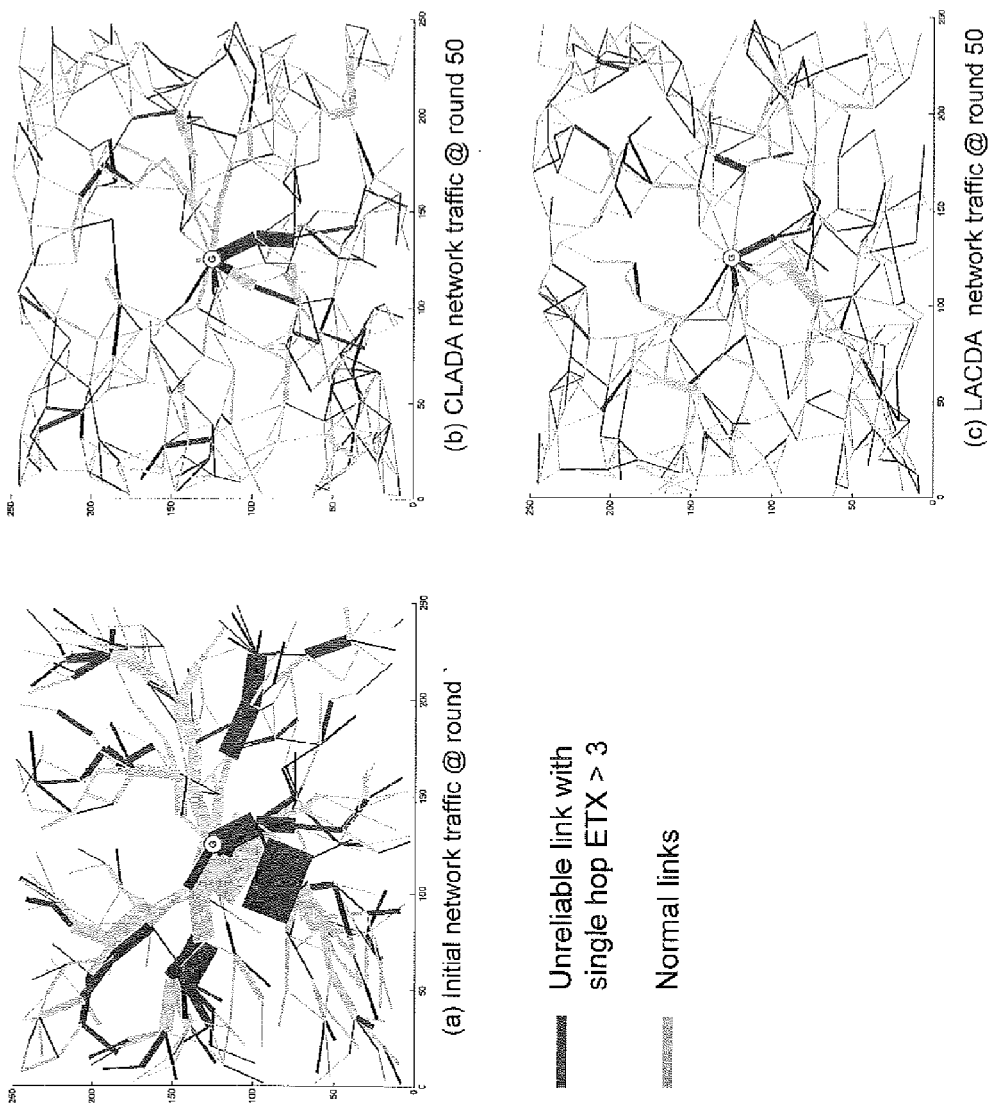
FIG. 24 illustrates a comparison in network traffic achieved using two different embodiments described herein.

FIG. 24 provides a comparison between the CLADA and LACDA approaches. FIGS. 24(b) and 24(c) show the extent of network traffic for the respective approaches after 50 rounds of time, compared to the initial traffic extent as shown in FIG. 24(a). FIG. 24 demonstrates that both CLADA and LACDA achieve a reduction in traffic through data aggregation, compared to the initial network traffic, although LACDA also ensures that a lower amount of traffic is sent via unreliable links.

Finally, the table of FIG. 25 shows the benefit of using the designed loop avoidance mechanism TTGF in the LACDA scheme. When TTGF is set to 0, only nodes with a lower layer ID compared to the objective node can be the next hop candidate, which significantly reduces the probability for possible data aggregations. A remarkable lifetime decrease for TTGF=0 can be seen in the table.

Figure 26:
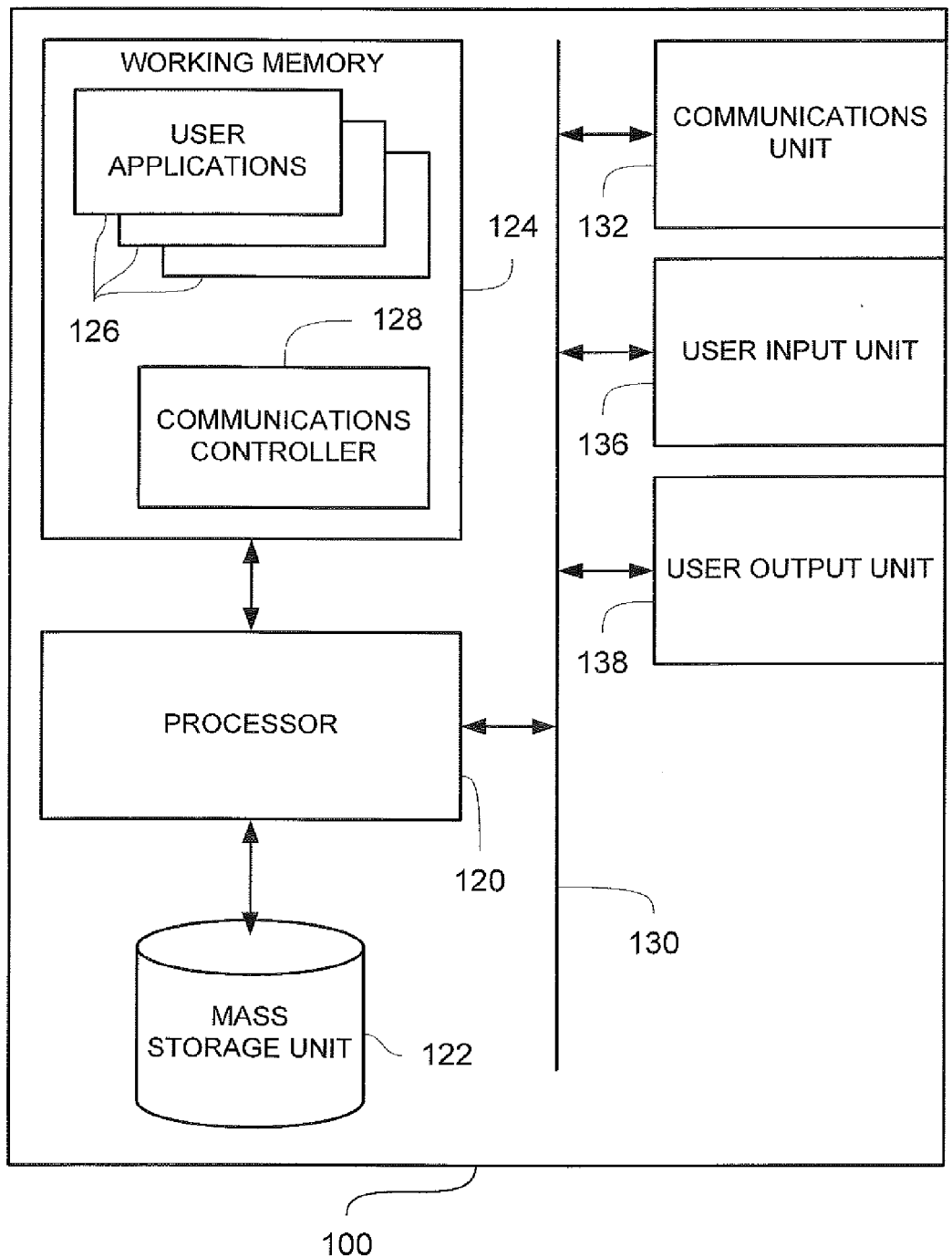
FIG. 26 illustrates apparatus capable of implementing a communications node suitable for performing a method of an embodiment described herein.

While the reader will appreciate that the above embodiments are applicable to any network, and to a variety of communications apparatus in such a network, a typical apparatus is illustrated in FIG. 26 which provides means capable of putting an embodiment, as described herein, into effect. As illustrated, the apparatus 100 comprises a processor 120 coupled to the mass storage unit 122, and accessing a working memory 124. Although, as illustrated, user applications 126 and a communications controller 128 are represented as software products stored in working memory 124, it will be appreciated that elements of the user applications 126 and a communications controller 128 may, for convenience, be stored in the mass storage unit 122. Usual procedures for the loading of software into memory and the storage of data in the mass storage unit 122 apply. The processor 120 also accesses, via bus 130, a user input unit 136 and a user output unit 138. A communications unit 132 operates to effect communications, either wireless or wired, with other apparatus.

Execution of the communications controller software 128 by the processor 120 causes an embodiment as described herein to be implemented. The communications controller software 128 can be embedded in original equipment, or can be provided, as a whole or in part, after manufacture. For instance, the communications controller software 128 can be introduced, as a whole, as a computer program product, which may be in the form of a download, or to be introduced via a computer program storage medium, such as an optical disk. Alternatively, modifications to an existing communications controller 128 can be made by an update, or plug-in, to provide features of the above described embodiment.

Embodiments described herein can conceivably be implemented in any of a wide range of wireless networks for multi-point to point routing purposes, such as wireless sensor networks, ad hoc networks, body area networks, AMI networks, Wi-Fi mesh, Flash Air and any other M2M networks. Particularly, for data collection in resource constrained M2M networks, a large number of heterogeneous sensor nodes are employed for continuous sensing and data gathering. An efficient data aggregation and delivery scheme can significantly extend the network lifetime. Hence, embodiments as described herein offer a potential for significant savings on network maintenance and to cut down node redeployment cost.

While certain embodiments have been described, these embodiments have been presented by way of example only, and are not intended to limit the scope of the inventions. Indeed, the novel methods and apparatus described herein may be embodied in a variety of other forms; furthermore, various omissions, substitutions and changes in the form of the methods and apparatus described herein may be made without departing from the spirit of the inventions. The accompanying claims and their equivalents are intended to cover such forms or modifications as would fall within the scope and spirit of the invention.

The invention claimed is:

1. A method of determining a communication link for sending communication data from a first communications node to any one of a plurality of neighbouring candidate nodes, comprising:
   i) for each candidate node, determining a marginal processing gain comprising a measure of the communication data reduction available through aggregating the communication data at the candidate node; and ii) selecting one of the candidate nodes for forming the communication link, wherein the selection is based at least in part on the marginal processing gain determined for each candidate node, wherein the marginal processing gain is part of an objective function that also comprises a measure of local lifetime gain, the local lifetime gain defining the change in lifetime of one or other of the neighboring candidate nodes achieved by allocating the communication data to the candidate node, and the method further comprises:

iii) evaluating the objective function for each candidate node in order to determine the node to be selected for the communication link.

2. A method in accordance with claim 1, wherein the measure of communication data reduction is normalised.

3. A method in accordance with claim 1, wherein the marginal processing gain for a candidate node comprises a difference between a measure of processing gain when allocating said communication data to that candidate node and a measure of processing gain without allocating said communication data to said candidate node.

4. A method in accordance with claim 1, wherein evaluating the objective function for a given candidate node comprises:

estimating the lifetime of each one of the neighbouring candidate nodes in the event that the communication data is allocated to the given candidate node;

estimating the lifetime of each one of the neighbouring candidate nodes in the event that the communication data is not allocated to the given candidate node; wherein in each case, the local lifetime is defined as the lifetime of the node having the smallest estimated lifetime among the neighbouring candidate nodes; and wherein the local lifetime gain for the given candidate node is determined based on the difference between the local lifetime in the event that the communication data is allocated to that candidate node and the local lifetime in the event that the communication data is not allocated to that candidate node.

5. A method in accordance with claim 4 wherein said measure of local lifetime gain is normalised by the local lifetime estimated for the case in which communication data is allocated to that candidate node.

6. A method in accordance with claim 4, wherein the lifetime of the neighbouring candidate nodes is estimated by estimating the energy consumption of those neighbouring candidate nodes.

7. A method in accordance with claim 6, wherein the energy consumption of each neighbouring candidate node is estimated by defining a link quality parameter between the first communications node and the respective neighbouring candidate node, wherein the link quality parameter reflects the likelihood that data will need to be transmitted more than once between the first communications node and the neighbouring candidate node in order to ensure its successful delivery.

8. A method in accordance with claim 7, wherein the link quality parameter defines the average number of times a bit of data will need to be transmitted in order to be successfully delivered from the first communications node to the respective neighbouring candidate node.

9. A method in accordance with claim 7, wherein for each candidate node, the lifetime of the first communications node is taken into consideration when determining the local lifetime gain in allocating the communication data to the candidate node.

10. A method in accordance with claim 1, wherein the objective function comprises a weighted sum of the measure of processing gain and the measure of local lifetime gain.

11. A method in accordance with claim 10 wherein the weighted sum is dependent on a weighting factor, the weighting factor being operable to balance, in the objective function, the effect of the measure of processing gain and the measure of local lifetime gain, with respect to sensitivity to network lifetime.

12. A method in accordance with claim 1, wherein the communication data comprises a plurality of data types and the method comprises carrying out steps i) and ii) for each type of data.

13. A method in accordance with claim 12, wherein each type of data comprises data capable of being aggregated by a respective function or application running on a node, so as to reduce the number of bits required to relay that data.

14. A method in accordance with claim 13, wherein each type of data comprises a sensor reading reflecting a different parameter of the environment.

15. A method in accordance with claim 12, wherein for each type of data, the marginal processing gain is part of an objective function that also comprises a measure of local lifetime gain, the local lifetime gain defining the change in lifetime of one or other of the neighbouring candidate nodes if allocating the communication data of the particular type to the candidate node;

the method comprising evaluating the objective function for each candidate node in order to determine the node to be selected for the communication link for the particular type of communication data.

16. A method in accordance with claim 15, wherein for each type of data, the objective function comprises a reward parameter that biases selection of the candidate node towards nodes that have the capability to aggregate data of that particular type.

17. A method in accordance with claim 15, wherein the objective function is executed at a number of intervals, the size of the intervals being determined based on the amount of variation in the type of data arriving at the first communications node.

18. A method in accordance with claim 17, comprising monitoring the number of different types of data arriving at the first communications node at each one a number of intervals;

for each interval, determining a change in the number of types of data that have arrived compared to the previous interval;

based on said change, determining a probability that the objective function should be executed; and where the probability is found to be above a threshold, executing the objective function.

19. A method in accordance with claim 18, wherein the threshold is obtained from a random number generator.

20. A method in accordance with claim 1, wherein the communication data is included within a data packet that also includes a communication progress factor, wherein the communication progress factor is used to govern selection of the candidate node for forward communication in the network towards an intended recipient node.

21. A method in accordance with claim 20, wherein the communication progress factor comprises an indication of the layer of the network in which the first communications node is located, wherein, when selecting a candidate node for the communication link, the first communications node excludes from consideration as candidate nodes all neighbouring nodes that are located in layers further away from the recipient node, unless those neighbouring nodes have the capability of performing data aggregation on the type of data being transmitted by the first communications node.

22. A method in accordance with claim 20, wherein the communication progress factor comprises:
an indication of the layer of the network in which the first communications node is located, and
a counter, wherein the counter's value is incremented each time the communication data is transmitted to a node in a layer that is as either the same as that of the first communications node or further away from the recipient node;
wherein, when the value of the counter reaches a threshold, the first communications node will only consider nodes that are located closer to the recipient node as candidate nodes for forwarding the communication data.

23. A communications apparatus operable in a network of communications apparatus, the apparatus being operable to determine a communication link for a communication from said apparatus to any one of a plurality of candidate neighbouring apparatuses, the apparatus comprising a processing gain determiner operable to determine, for each candidate node, a marginal processing gain comprising a measure of communication data reduction available through aggregating communication data at the candidate node; and
a communication link selector operable to select one of the candidate nodes for forming the communication link, the selection being based at least in part on the marginal processing gain determined for each candidate node, wherein
the marginal processing gain is part of an objective function that also comprises a measure of local lifetime gain, the local lifetime gain defining the change in lifetime of one or other of the neighboring candidate nodes achieved by allocating the communication data to the candidate node, and
the communication link selector further is operable to evaluate the objective function for each candidate node in order to determine the node to be selected for the communication link.

24. A computer program product comprising computer executable instructions which, when executed by a computerised communications apparatus, causes that apparatus to perform a method in accordance with claim 1.

* * * * *